(12) United States Patent
Yasui

(10) Patent No.: US 7,281,503 B2
(45) Date of Patent: Oct. 16, 2007

(54) CONTROL APPARATUS

(75) Inventor: Yuji Yasui, Saitama-ken (JP)

(73) Assignee: Honda Motor Co., Ltd., Tokyo (JP)

( * ) Notice: Subject to any disclaimer, the term of this patent is extended or adjusted under 35 U.S.C. 154(b) by 100 days.

(21) Appl. No.: 11/319,739

(22) Filed: Dec. 29, 2005

(65) Prior Publication Data

US 2006/0180108 A1 Aug. 17, 2006

(30) Foreign Application Priority Data

Jan. 27, 2005 (JP) .............................. 2005-020416

(51) Int. Cl.
*F01L 1/34* (2006.01)

(52) U.S. Cl. .............................. 123/90.15; 123/90.17; 123/347

(58) Field of Classification Search ............. 123/90.15, 123/90.16, 90.17, 90.18, 90.27, 90.31, 345, 123/346, 347, 348
See application file for complete search history.

(56) References Cited

U.S. PATENT DOCUMENTS 6,938,593 B2 * 9/2005 Magner et al. .......... 123/90.16

* cited by examiner

*Primary Examiner*—Ching Chang
(74) *Attorney, Agent, or Firm*—Arent Fox LLP

(57) ABSTRACT

A control apparatus is provided for restraining fluctuations in the output due to disturbance and the like to achieve high stability and control accuracy for the output of a control object. The control apparatus calculates a virtual interference input applied to the control object in order to generate a virtual interfering force for holding the detected output of the control object at a predetermined value. The control apparatus assumes the control object applied with the virtual interference input as an enlarged control object, and calculates a virtual control input applied to the enlarged control object based on a predetermined response specifying control algorithm such that the output of the enlarged control object converges to a set target value.

18 Claims, 12 Drawing Sheets

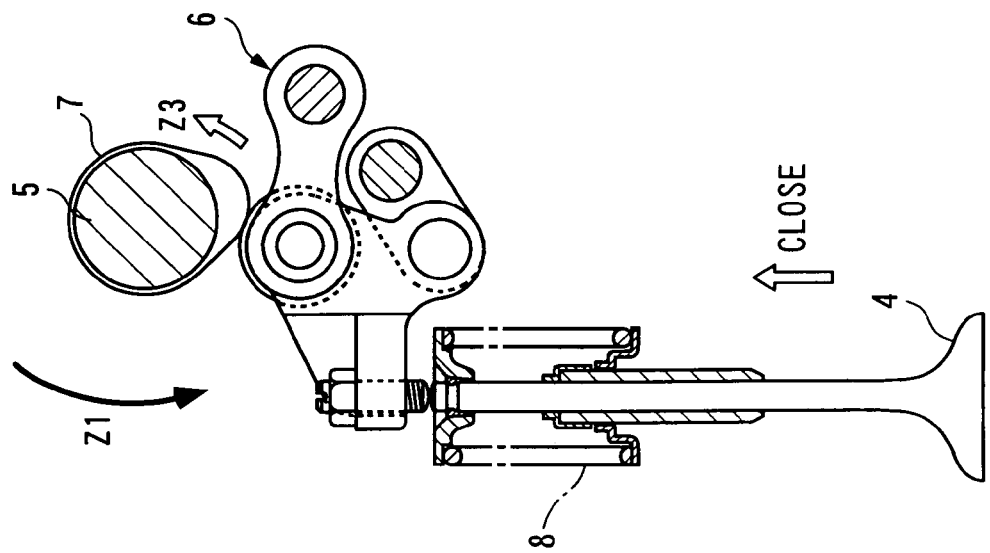
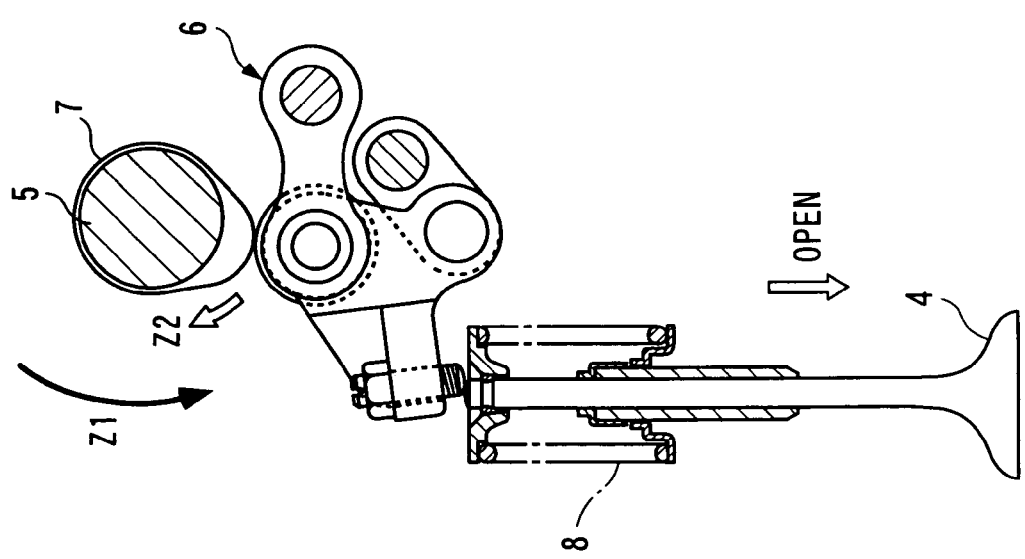

F I G. 7
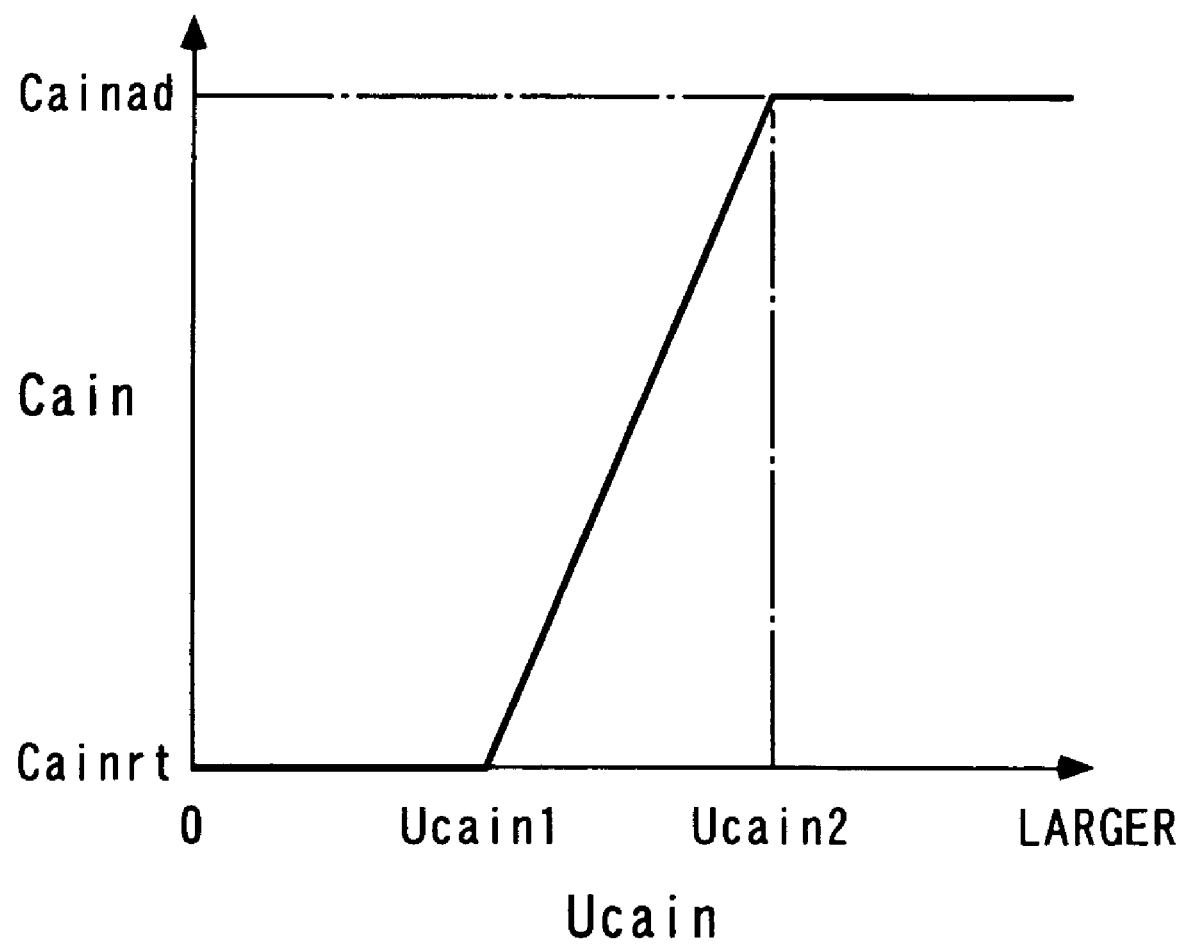

CONTROL APPARATUS

BACKGROUND OF THE INVENTION

1. Field of the Invention

The present invention relates to a control apparatus for controlling the output of a control object.

2. Description of the Prior Art

A known control apparatus of the type mentioned above is disclosed, for example, in Laid-open Japanese Patent Application No. 2001-227385. This control apparatus controls the opening of a throttle valve of an internal combustion engine which is intended for the output of a control object. The opening of the throttle valve (hereinafter simply called the "throttle opening") is determined by the balance of an urging force generated by a return spring which urges the throttle valve in a closing direction at all times and a driving force generated by a motor which is connected to the throttle valve. Also, the control apparatus calculates a control input to the motor in the following manner to control the throttle opening such that it converges to a target opening. Specifically, the control apparatus first calculates a preliminary value for the control input based on an actual throttle opening and a target opening in accordance with a sliding mode control algorithm. Then, in consideration of hysteresis of the return spring, the control apparatus calculates the control input to the motor by adding a predetermined value commensurate with the hysteresis to the calculated preliminary value. In this way, the control apparatus controls the throttle opening with high accuracy in accordance with the hysteresis of the return spring.

However, when the conventional control apparatus described above is applied to a control object which presents low stability, the following problems may arise. Specifically, in a control system which includes a control object that presents low stability, when the output of the control object is controlled to reach a target value, the control object tends to suffer from fluctuations in the output when periodic disturbance acts thereon, and from a large instantaneous deviation when large disturbance instantaneously acts thereon, respectively. In response to such a behavior, the conventional control apparatus merely adds a predetermined value commensurate with the hysteresis of the return spring, so that fluctuations or an instantaneous large deviation is highly likely to appear in the output. Particularly, the sliding mode control has a high responsibility of the output to a target value, so that if the output fluctuates at high frequencies due to the influence of periodic high-frequency disturbance, the control input can resonate with the fluctuations, thereby possibly causing a further increase in the deviation. As described above, the conventional control apparatus is incapable of providing high stability and control accuracy for the output of the control object.

SUMMARY OF THE INVENTION

The present invention has been made to solve the problems as mentioned above, and it is an object of the invention to provide a control apparatus which is capable of restraining fluctuations and the like in the output of a control object caused by disturbance, and is capable of achieving high stability and control accuracy for the output of the control object.

To achieve the above object, according to a first aspect of the present invention, there is provided a control apparatus which is characterized by comprising output detecting means for detecting an output of a control object; virtual interference input calculating means for calculating a virtual interference input applied to the control object in order to generate a virtual interfering force for holding the detected output of the control object at a predetermined value; target value setting means for setting a target value which is a target for the output of the control object; and virtual control input calculating means which assumes the control object applied with the virtual interference input as an enlarged control object for calculating a virtual control input applied to the enlarged control object based on a predetermined response specifying control algorithm such that an output of the enlarged control object converges to the set target value.

According to this control apparatus, the virtual interference input applied to the control object is calculated by the virtual interference input calculating means in order to generate a virtual interfering force for holding the detected output of the control object at a predetermined value. In this way, since the virtual interfering force acts on the output of the control object to hold the output at the predetermined value, the control apparatus can restrain fluctuations in the output due to disturbance. Also, the control object applied with the virtual interference input is assumed as the enlarged control object, and the virtual control input applied to the enlarge control object is calculated by the virtual control input calculating means based on a predetermined response specifying control algorithm such that the output of the enlarged control object converges to a set target value. Thus, fluctuations in the output caused by periodic disturbance can be restrained by restraining the fluctuations in the output due to the disturbance by the virtual interference input. In addition, the output is controlled to converge to the target value by calculating the virtual control input based on the response specifying control algorithm while fluctuations in the output are kept restrained, thereby making it possible to restrain an instantaneous large deviation caused by instantaneous disturbance and therefore achieve high stability and control accuracy for the output of the control object. Further, since the virtual control input is calculated based on the response specifying control algorithm, a deviation caused by low-frequency disturbance, in particular, can be eliminated without giving rise to an overshoot or a vibratory behavior.

Also, unlike before, the control of the output based on the response specifying control algorithm can be conducted while the high-frequency fluctuations in the output are kept restrained by the virtual interference input, so that the virtual control input can be prevented from resonating with the high-frequency fluctuations in the output. Thus, a deviation restraining capability can be improved by aggressively increasing a feedback gain of the response specifying control algorithm.

To achieve the above object, according to a second aspect of the present invention, there is provided a control apparatus which is characterized by comprising output detecting means for detecting an output of a control object; virtual interference input calculating means for calculating a virtual interference input applied to the control object in order to generate a virtual interfering force for holding the detected output of the control object at a predetermined value; target value setting means for setting a target value which is a target for the output of the control object; and virtual control input calculating means which assumes the control object applied with the virtual interference input as an enlarged control object for calculating a virtual control input applied to the enlarged control object based on a predetermined two-degree-of-freedom control algorithm such that an output of the enlarged control object converges to the set target value.

According to this control apparatus, the virtual interference input applied to the control object is calculated by the virtual interference input calculating means in order to generate a virtual interfering force for holding the detected output of the control object at a predetermined value. In this way, since the virtual interfering force acts on the output of the control object to hold the output at the predetermined value, the control apparatus can restrain fluctuations in the output due to disturbance in a manner similar to the control apparatus of the first aspect described above. Also, the control object applied with the virtual interference input is assumed as the enlarged control object, and the virtual control input applied to the enlarge control object is calculated by the virtual control input calculating means based on a predetermined two-degree-of-freedom control algorithm such that the output of the enlarged control object converges to a set target value. Thus, fluctuations in the output caused by periodic disturbance can be restrained by restraining the fluctuations in the output due to the disturbance by the virtual interference input. In addition, the output is controlled to converge to the target value by calculating the virtual control input based on the two-degree-of-freedom control algorithm while fluctuations in the output are thus kept restrained, thereby making it possible to restrain an instantaneous large deviation caused by instantaneous disturbance and therefore achieve high stability and control accuracy for the output of the control object.

Further, when a target value filter type two-degree-of-freedom sliding mode control algorithm, for example, is used as the two-degree-of-freedom control algorithm, the control input can resonate with high-frequency fluctuations in the output if a faster convergence speed and a better convergence behavior are specified. In contrast, according to the present invention, since the control of the output based on the two-degree-of-freedom control algorithm can be conducted while the high-frequency fluctuations in the output are kept restrained by the virtual interference input, the control apparatus can avoid the virtual control input from resonating with the high-frequency fluctuations in the output. Consequently, the control apparatus can aggressively specify a faster convergence speed and a better convergence behavior, and individually set them as appropriate.

To achieve the above object, according to a third aspect of the present invention, there is provided a control apparatus which is characterized by comprising output detecting means for detecting an output of a control object; virtual interference input calculating means for calculating a virtual interference input applied to the control object in order to generate a virtual interfering force for holding the detected output of the control object at a predetermined value; disturbance estimate calculating means which assumes the control object applied with the virtual interference input as an enlarged control object for compensating for disturbance received by the enlarged control object; and virtual control input calculating means for calculating a virtual control input applied to the enlarged control object for controlling an output of the enlarge control object in accordance with the calculated disturbance estimate through a predetermined control algorithm.

According to this control apparatus, the virtual interference input applied to the control object is calculated by the virtual interference input calculating means in order to generate a virtual interfering force for holding the detected output of the control object at a predetermined value. In this way, since the virtual interfering force acts on the output of the control object to hold the output at the predetermined value, the control apparatus can restrain fluctuations in the output due to disturbance in a manner similar to the control apparatuses of the first and second aspects described above. Also, the control object applied with the virtual interference input is assumed as the enlarged control object, and the disturbance estimate is calculated by the disturbance estimate calculating means for compensating for disturbance received by the enlarged control object. Then, the virtual control input applied to the enlarged control object for controlling the output of the enlarged control object is calculated by the virtual control input calculating means in accordance with the calculated disturbance estimate through a predetermined control algorithm, and the output of the enlarged control object is controlled by the virtual control input. Thus, since the disturbance estimate is calculated while fluctuations in the output due to disturbance are kept restrained by the virtual interference input, the control apparatus can improve a disturbance estimation accuracy with the aid of the disturbance estimate. Accordingly, since the output is thus controlled in accordance with the disturbance estimate value having a high disturbance estimation accuracy, the control apparatus can restrain fluctuations in the output caused by disturbance and the like to achieve high stability and control accuracy for the output of the control object.

Preferably, in the control apparatus of any of the first to third aspects of the present invention, the virtual interference input calculating means calculates the virtual interference input at a predetermined period, the virtual control input calculating means calculates the virtual control input based on a model which defines a relationship between the virtual control input and the output of the enlarged control object, and sampling periods of the virtual control input used for defining the model and the output of the enlarged control object are set to values different from the predetermined period.

According to this preferred embodiment of the control apparatus, the sampling periods of the virtual control input used for defining the model and the output of the enlarged control object are set to values different from the predetermined period. In this way, it is possible to avoid a simultaneous increase in the virtual interference input and the sensitivity of the virtual control input for the deviation caused by disturbance in the same frequency band. For example, by setting the sampling periods longer than the predetermined period, the virtual control input becomes more sensitive to a deviation caused by disturbance in a lower frequency range, while the virtual interference input becomes more sensitive to a deviation caused by disturbance in a higher frequency range. It is therefore possible to prevent the output of the control object from losing the stability due to the resonance of both.

Preferably, the control apparatus of any of the first to third aspects of the present invention, further comprises a changing speed calculating means for calculating a changing speed of a deviation of the output of the control object from the predetermined value, wherein the virtual interference input calculating means calculates the virtual interference input in accordance with the calculated changing speed.

According to this preferred embodiment of the control apparatus, the virtual interference input is calculated in accordance with the changing speed of the deviation of the output of the control object from the predetermined value. In this way, since the virtual interfering force can be provided with a virtual damping characteristic, the control apparatus can restrain fluctuations in the output due to disturbance and additionally restrain the changing speed of the output at that time, thereby further restraining high-frequency fluctuations in the output which have a higher changing speed.

Preferably, the control apparatus of any of the first to third aspects of the present invention, further comprises a changing rate calculating means for calculating a changing rate of the virtual interference input; and changing rate restricting means responsive to the calculated changing rate of the virtual interference input being higher than a predetermined changing rate for restricting the changing rate of the virtual interference input to different restricted values when the virtual interference input is increasing and when the virtual interference input is decreasing.

According to this preferred embodiment of the control apparatus, the changing rate of the virtual interference input is restricted by the changing rate restricting means when the changing rate of the virtual interference input is higher than a predetermined changing rate, in which case different restricted values are used when the virtual interference input is increasing and when the virtual interference input is decreasing, respectively. When instantaneously large disturbance or periodic disturbance having a frequency substantially equal to the natural frequency of the enlarged control object acts on the enlarged control object, the virtual interfering force periodically increases and decreases in response to such disturbance, causing the output to possibly fluctuate over an excessive width while it is periodically vibrating. Therefor, by restricting the changing rate of the virtual interference input to restricted values different from each other for the increasing or decreasing virtual interference input when the changing rate of the virtual interference input is higher than the predetermined changing rate, i.e., when the virtual interfering force periodically increases and decreases in response to the disturbance as described above, the control apparatus can avoid a periodic increasing and decreasing behavior of the virtual interfering force to prevent the output from fluctuating over an excessively large width.

Preferably, in the control apparatus according to any of the first to third aspects of the present invention, the control object includes a variable cam phase mechanism for changing a cam phase of at least one of an intake cam shaft and an exhaust cam shaft of an internal combustion engine with respect to a crank shaft, the output of the control object is the cam phase, the virtual interference input is applied to the variable cam phase mechanism, and the enlarged control object includes the variable cam phase mechanism applied with the virtual interference input.

The variable cam phase mechanism is provided in an internal combustion engine for purposes of improving the fuel economy, exhaust characteristic, and drivability by changing the cam phase. On the other hand, the foregoing preferred embodiment of the control apparatus can restrain fluctuations in the cam phase caused by disturbance and the like to achieve high stability and control accuracy for the cam phase, thus improving the fuel economy, exhaust characteristic, and drivability.

Preferably, in the control apparatus according to any of the first to third aspects of the present invention, the control object includes an internal combustion engine, the output of the control object is a rotational speed of the internal combustion engine, the virtual interfering force is applied to the internal combustion engine, and the enlarged control object includes the internal combustion engine applied with the virtual interference input.

The internal combustion engine tends to lose the stability due to a lower rotational speed when it is switched from a normal operating condition to an idling operating condition. On the other hand, the foregoing preferred embodiment of the control apparatus can restrain fluctuations in the rotational speed to avoid a lower rotational speed upon switching to an idling operation, thus achieving high stability and control accuracy for the rotational speed.

BRIEF DESCRIPTION OF THE DRAWINGS

FIGS. 2A and 2B are diagrams for describing operations when an intake cam is driving an intake valve in a valve opening direction (FIG. 2A), and when the intake cam is driving the intake valve in a valve closing direction (FIG. 2B);

FIG. 7 is a characteristic curve representing the operation characteristic of the electromagnetic variable cam phase mechanism;

DETAILED DESCRIPTION OF THE EMBODIMENTS

Figure 1:
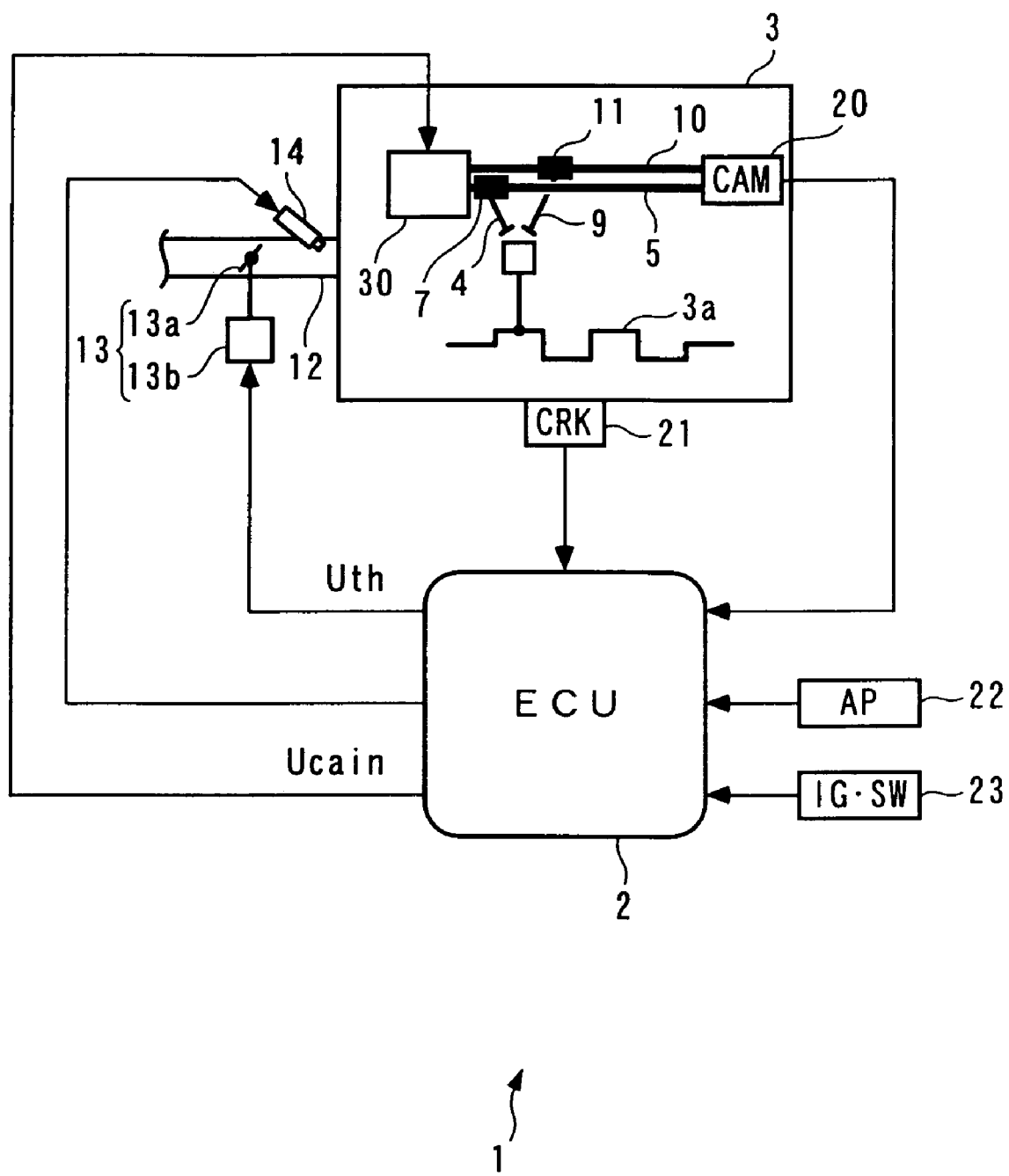
FIG. 1 is a diagram generally illustrating a control apparatus according to the present invention together with an internal combustion engine which employs the control apparatus.

In the following, a control apparatus according to a first embodiment of the present invention will be described in detail with reference to the accompanying drawings. As illustrated in FIG. 1, the control apparatus 1 comprises an electromagnetic variable cam phase mechanism 30 arranged in an internal combustion engine (hereinafter called the "engine") 3, and an ECU 2 for controlling the electromagnetic variable cam phase mechanism 30.

The engine 3, which may be a DOHC type gasoline engine equipped in a vehicle (not shown), comprises an intake valve 4 for opening/closing an intake port (not shown); an exhaust valve 9 for opening/closing an exhaust port (not shown); an intake cam shaft 5 and an intake rocker arm 6 (see FIG. 2) for driving an intake valve 4; and an exhaust cam shaft 10 and an exhaust rocker arm (not shown) for driving an exhaust valve 9. These intake and exhaust cam shafts 5, 10 comprise an intake cam 7 and an exhaust cam 11 integrally arranged therewith, respectively. Also, the intake valve 4 and the exhaust valve 9 comprise an intake valve spring 8 and an exhaust valve spring (not shown), respectively, for urging these valves in a closing direction at all times.

Figure 3:
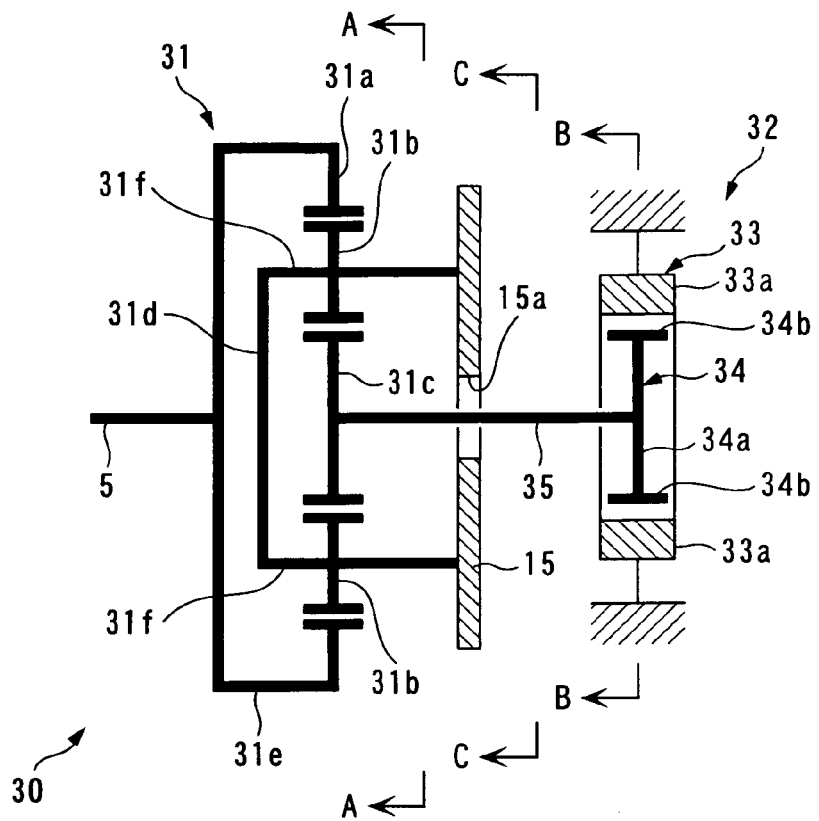
FIG. 3 is a diagram schematically illustrating the general configuration of an electromagnetic variable cam phase mechanism.

As illustrated in FIG. 3, a sprocket 15 is coaxially coupled to the intake cam shaft 5 through a planetary gear device 31, later described, of the electromagnetic variable cam phase mechanism 30. This sprocket 15 is coupled to a crank shaft 3a through a timing belt (not shown), so that the intake cam 7 rotates once each time the crank shaft 3a rotates twice. The rotation of the intake cam 7 causes intake rocker arm 6 to pivotally move, thereby opening and closing the intake valve 4 against an urging force Fvvs (see FIG. 8) of the valve spring 8.

A sprocket (not shown) is also coupled to the exhaust cam shaft 10. The sprocket is coupled to the crank shaft 3a through a timing belt, so that the exhaust cam 11 rotates once each time the crank shaft 3a rotates twice. The rotation of the exhaust cam 11 causes the exhaust rocker arm to pivotally move, thereby opening and closing the intake valve 4 against an urging force of the exhaust valve spring.

The electromagnetic variable cam phase mechanism 30 varies a phase Cain of the intake cam shaft 5 to the crank shaft 3a (hereinafter called the "cam phase") in a continuous manner within a predetermined range (a range between a maximum retard value Cainrt and a maximum advance value Cainad, later described), and comprises the planetary gear device 31 and an electromagnetic brake 32, as illustrated in FIGS. 3 to 6.

The planetary gear device 31, which acts to transmit the rotation between the intake cam shaft 5 and the sprocket 15, comprises a ring gear 31a, three planetary pinion gears 31b, a sun gear 3, and a planetary carrier 331d. The ring gear 31a is integrally coupled to the intake cam shaft 5 through an outer 31e, so that the ring gear 31a rotates coaxially and integrally with the intake cam shaft 5.

The planetary carrier 31d is formed substantially in a triangular shape, and comprises shafts 31f at its three corners, respectively. The planetary carrier 31d is also integrally coupled to the sprocket 15 through these shafts 31f, and is thereby permitted to rotate coaxially and integrally with the sprocket 15. Each of the planetary pinion gear 31b is rotatably supported by each of the shafts 31f of the planetary carrier 31d, and disposed between the sun gear 31c and the ring gear 31a to mesh with these gears.

The electromagnetic brake 32 comprises an outer casing 33, a core 34, a coupling shaft 35, a maximum retard stopper 36, a maximum advance stopper 37, and a return spring 38. The outer casing 33 is formed to be hollow, and fixed to a holder so that it cannot rotate. A plurality (for example, four) of electromagnets 33a are arranged on the inner peripheral surface of the outer casing 33 in close proximity to each other in the circumferential direction. These electromagnets 33a are applied with a control input Cain, later described, from the ECU 2.

The core 34 comprises a discoidal base 34a, and the same number of permanent magnets 34b as the electromagnets 33a, which are arranged on the outer peripheral surface of the base 34a in close proximity to each other in the circumferential direction. Two adjacent permanent magnets 34b are set to have magnetic poles different from each other. The core 34 is rotatably fitted in the outer casing 33, so that the permanent magnets 34b oppose the electromagnets 33a across a slight gap. Further, the electromagnets 33a and the permanent magnets 34b make up a DC brushless motor which uses the electromagnets 33a as a stator and the permanent magnets 34b as a rotor. As the control input Ucain is applied to the electromagnets 33a, the core 34 rotates relative to the outer casing 33.

The coupling shaft 35 has one end coaxially connected to the base 34a, and the other end likewise coaxially coupled to the sun gear 31c, respectively. With this structure, the core 34 rotates coaxially and integrally with the sun gear 31c. Also, a central portion of the coupling shaft 35 is rotatably inserted in a central hole 15a of the sprocket 15, and an arm extending in a radial direction is integrally arranged in a portion of the coupling shaft 35 closer to the electromagnetic brake 32 from the central portion.

The maximum retard stopper 36 and the maximum advance stopper 37 are arranged on opposing surfaces of the electromagnetic brake 32 of the sprocket 15 such that they oppose each other across a predetermined spacing in the circumferential direction. Also, the arm 35a is arranged between these stoppers 36, 37. With this structure, the arm 35a is arranged for pivotal movement relative to the sprocket 15 between a maximum retard position (a position indicated by a solid line in FIG. 6) at which the arm 35a abuts to the maximum retard stopper 36 and stopped thereby and a maximum advance position (a position indicated by two-dot chain line inn FIG. 6) at which the arm 35a abuts to the maximum advance stopper 37 and stopped thereby.

The return spring 38 comprises a helical extension spring, one end of which is connected to an outer end of the arm 35a of the coupling shaft 35, and the other end connected to a fixed portion 15b of the sprocket 15, respectively. The return spring 38 also urges the arm 35a toward the maximum retard stopper 36.

Next, a description will be made on the operation of the electromagnetic variable cam phase mechanism 30 in the configuration described above. In this electromagnetic variable cam phase mechanism 30, when the control input Ucain is not applied to the electromagnets 33a of the electromagnetic brake 32, the arm 35a of the coupling shaft 35 is held by an urging force Frs of the return spring 38 at the maximum retard position at which the arm 35a of the coupling shaft 35 abuts to the maximum retard stopper 46, thereby holding the cam phase Cain at the maximum retard value (see FIG. 7).

Figure 6:
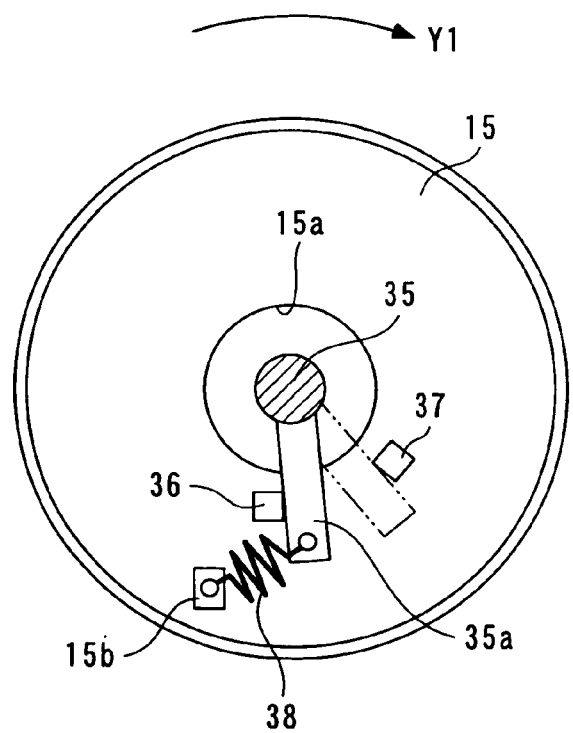
FIG. 6 is a schematic diagram of the electromagnetic brake and a sprocket viewed from a direction along a line C-C in FIG. 3.

In this state, as the sprocket 15 rotates once in a direction indicated by an arrow Y in FIG. 6 with the rotation of the crank shaft 3a, the planetary carrier 31d integral with the sprocket 15, and the sun gear 31c coupled to the sprocket 15 through the return spring 38 and the coupling shaft 35 also rotate at the same rotational speed as the sprocket 15. In this way, the planetary pion gear 31b does not rotate, while the ring gear 31a also rotates at the same rotational speed as the sprocket 15, thereby causing the intake cam shaft 5 to rotate in a direction indicated by an arrow Y1 at the same rotational speed as the sprocket 15.

During the rotation of the crank shaft 3a, as the control input Ucain is applied to the electromagnets 33a with the arm 35a being held at the maximum retard position, a braking force Fsol acts on the core 34 which has been rotating integrally with the sun gear 31c, to reduce the rotational speed of the core 34. As the core 34 is decelerated with the braking force Fsol, the coupling shaft 35 connected to the core 34 rotates in a direction opposite to Y1 relative to the sprocket 15. As a result, the arm 35a pivotally moves against the urging force Frs of the return spring 38 toward the maximum advance stopper 37, i.e., toward the maximum advance position, to a position at which the braking force Fsol balances the urging force Frs.

Figure 4:
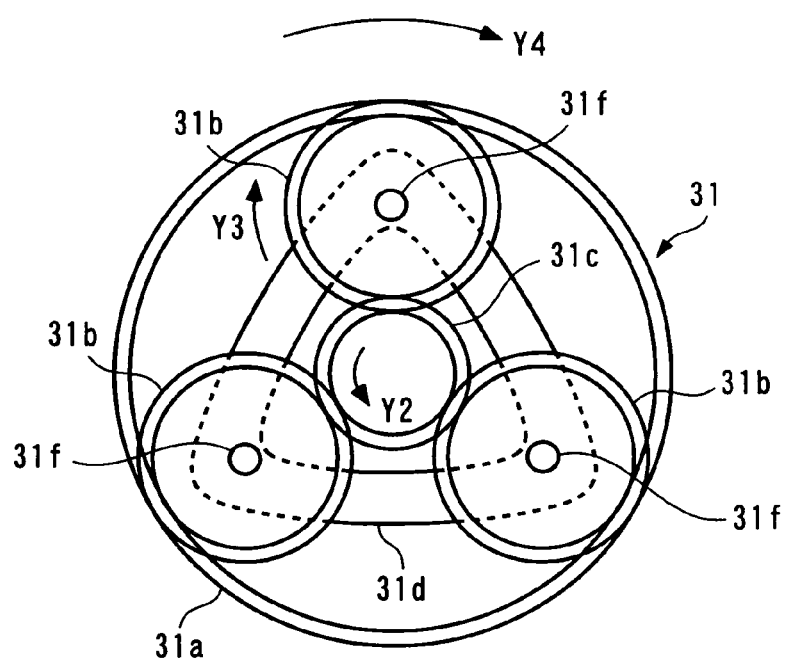
FIG. 4 is a schematic diagram of a planetary gear device viewed from a direction along a line A-A in FIG. 3.
Figure 5:
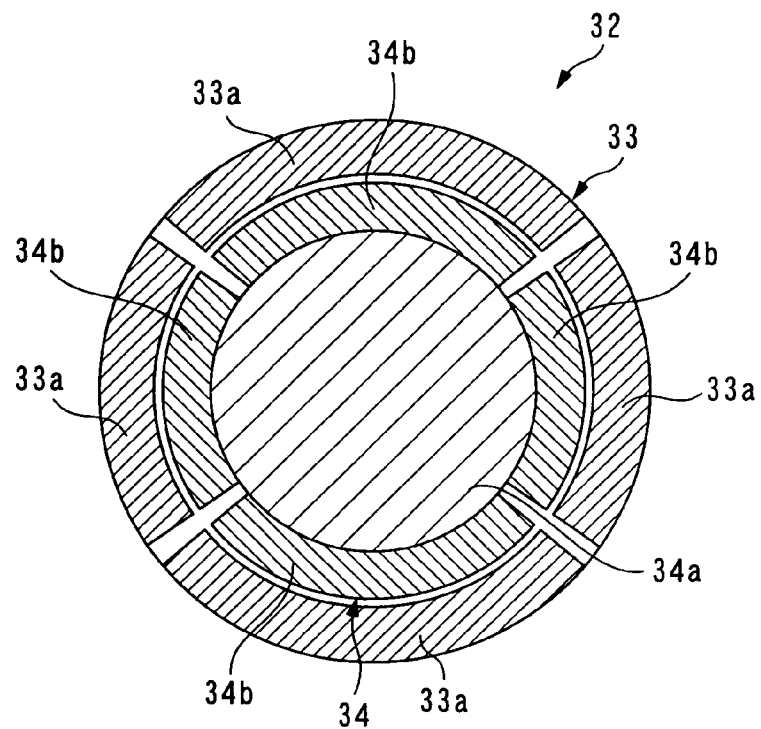
FIG. 5 is a cross-sectional view of an electromagnetic brake taken along a line B-B in FIG. 3.

Together with the foregoing operation, the sun gear 31c connected to the coupling shaft 35 rotates in a direction indicated by an arrow Y2 in FIG. 4 relative to the planetary carrier 31d, causing the planetary pinion gear 31b to rotate in a direction indicated by an arrow Y3 in FIG. 4. Eventually, the ring gear 31a rotates in a direction indicated by an arrow Y4 in FIG. 4. In other words, the intake cam shaft 5 rotates relative to the sprocket 15 in the direction in which the sprocket 15 rotates (i.e., in the direction indicated by the arrow Y4 in FIG. 4), to advance the cam phase Cain.

In the foregoing manner, in the electromagnetic variable cam phase mechanism 30, the braking force Fsol acts in a direction in which the cam phase Cain is advanced, while the urging force Frs of the return spring 38 acts in a direction in which the cam phase Cain is retarded, and the can phase Cain is held at a value at which the braking force Fsol and the urging force Frs balance with each other as long as the braking force Fsol remains unchanged. Also, a range in which the arm 35a can pivotally move is restricted in the range between the maximum retard position indicated by a solid line in FIG. 6 and the maximum advance position indicated by a two-dot chain line in FIG. 6, so that a range in which the cam phase Cain is controlled is restricted in a range between the maximum retard value Cainrt and the maximum advance value Cainad.

Next, a description will be made on the operational characteristics of the electromagnetic variable cam phase mechanism 30 configured as described above. As illustrated in FIG. 7, in the electromagnetic variable cam phase mechanism 30, the cam phase Cain is held at the maximum retard value Cainrt (for example, a cam angle of 0°) in a range in which the control input Ucain to the electromagnets 33 is smaller than a predetermined value Ucain1, and is held at the maximum advance angle Cainad (for example, a cam angle of 55°) in a range in which the control input Ucain is larger than the predetermined value Ucain2. Also, in a range expressed by Ucain1≦Ucain≦Ucain2, the cam phase Cain continuously varies between the maximum retard value Cainrt and the maximum advance angle Cainad. Though not shown, it should be noted that the electromagnetic variable cam phase mechanism 30 has a so-called hysteresis characteristic, i.e., the value of the cam phase Cain for the control input Ucain is slightly different when the control input Ucain increases and when the control input Ucain decreases.

A cam angle sensor 20 is disposed at an end of the intake cam shaft 5 opposite to the electromagnetic variable cam phase mechanism 30. This cam angle sensor 20 is comprised, for example, of a magnet rotor and an MRE pickup, and outputs a CAM signal, which is a pulse signal, to the ECU 2 every predetermined cam angle (for example, 1°) with the rotation of the intake cam shaft 5.

The intake pipe 12 of the engine 3 is provided with a throttle mechanism 13 which comprises a throttle valve 13a and a motor 13b coupled thereto. The opening of the throttle valve 13a (hereinafter called the "throttle opening") is controlled by driving the motor 13b with a control input Uth, later described, from the ECU 2.

An injector 14 is further disposed at a location downstream of the throttle valve 13a in the intake pipe 12 of the engine 3. The injector 14 is controlled by a control signal from the ECU 2 to inject a fuel into the intake pipe 12.

An engine 3 is also provided with a crank angle sensor 21 which outputs a CRK signal, which is a pulse signal, to the ECU 22 as the crank shaft 3a is rotating.

One pulse of the CRK signal is outputted every predetermined crank angle (for example, 30°). In response to the CRK signal, the ECU 2 calculates a rotational speed NE of the engine 3 (hereinafter called the "engine rotational speed"), and also calculates the cam phase Cain based on the CRK signal and the CAM signal generated by the aforementioned cam angle sensor 20.

An accelerator opening sensor 22 and an ignition switch (hereinafter called the "IG/SW") 23 are further connected to the ECU 2. The accelerator opening sensor 22 detects the opening of an accelerator pedal, not shown, (hereinafter called the "accelerator opening") AP which is outputted to the ECU 2. The IG/SW 23 is turned ON/OFF by manipulating an ignition key (not shown), and outputs a signal indicative of its ON/OFF state to the ECU 2.

The ECU 2, which is based on a microcomputer that comprises an I/O interface, a CPU, a RAM, a ROM and the like, determines the operating condition of the engine 3 in accordance with detection signals of a variety of the aforementioned sensors 20-22, the ON/OFF signal of the IG/SW 23, and the like, and executes a cam phase control routine, as will be later described.

In this embodiment, the ECU 2 implements output detecting means, virtual interference input calculating means, target value setting means, virtual control input calculating means, disturbance estimate calculating means, changing speed calculating means, changing rate calculating means, and a changing rate limiting means.

Next, the control apparatus 1 of the present invention will be described. The control apparatus 1 is configured on the basis of the following technical viewpoints. Specifically, as described above, the electromagnetic variable cam phase mechanism 30 rotates the coupling shaft 35 coupled to the sprocket 15 through the return spring 38 in a direction opposite to the direction in which the sprocket 15 rotates, against the urging force Frs of the return spring 38 with the braking force Fsol, to change the cam phase Cain in the advance direction, so that the braking force Fsol acts on the crank shaft 3a as a load. Therefore, when a large braking force Fsol is required to advance the cam phase Cain, the engine 3 will be correspondingly degraded in efficiency. For this reason, the spring constant of the return spring 38 is preferably set to a smaller value such that the cam phase Cain can be advanced with a small braking force Fsol, for purposes of increasing the efficiency of the engine 3.

On the other hand, when the intake cam 7 is rotating in a direction indicated by an arrow Z1 in FIG. 2A to drive the intake valve 4 in a valve opening direction as illustrated in FIG. 2A, the urging force Fvvs of the valve spring 8 acts as a counter-force for rotating the intake cam 7 in a direction indicated by an arrow Z2 in FIG. 2A, and for the cam phase Cain, the urging force Fvvs of the valve spring 8 acts as disturbance for fluctuating the cam phase Cain in the retard direction. On the other hand, when the intake cam 7 is driving the intake valve 4 in a valve closing direction as illustrated in FIG. 2B, the urging force Fvvs of the valve spring 8 acts as an external force for rotating the intake cam 7 in a direction indicated by an arrow Z3 in FIG. 2B, and for the cam phase Cain, the urging force Fvvs of the valve spring 8 acts as disturbance for fluctuating the cam phase Cain in the advance direction. The disturbance caused by the urging force Fvvs of the valve spring 8 as described above occurs on a periodic basis as the intake cam shaft 5 rotates at high speeds, and therefore periodically occurs at high frequencies.

Figure 8:
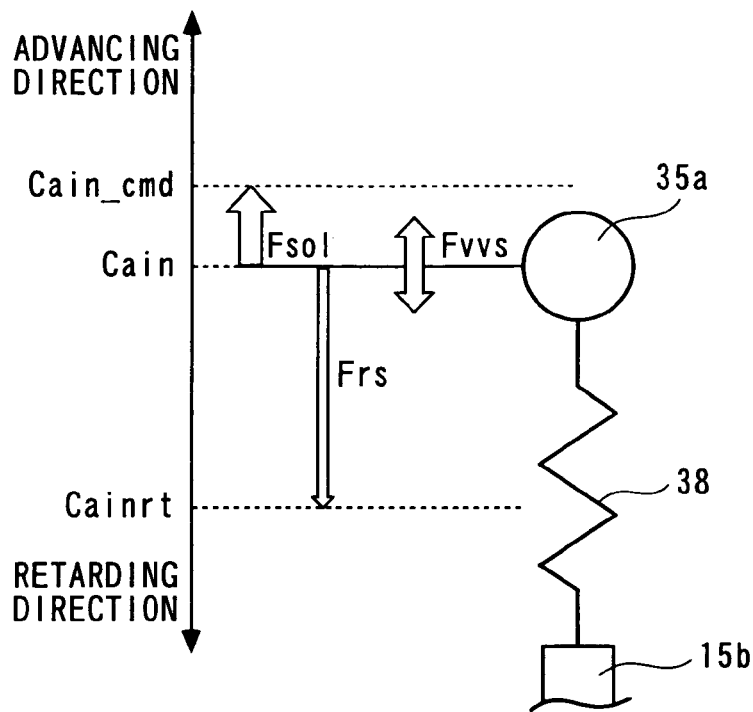
FIG. 8 is a diagram for describing the relationship among a cam phase Cain, a braking force Fsol, a urging force Frs of a return spring, and an urging force Fvvs of a valve spring.

In the electromagnetic variable cam phase mechanism 30 as described above, in regard to a control system for controlling the cam phase Cain to converge to a target cam phase Cain_cmd (target value), the braking force Fsol, the urging force Frs of the return spring 38, and the urging force Fvvs of the valve spring 8 act on the cam phase Cain in the following manner. Specifically, as illustrated in FIG. 8, the braking force Fsol acts on the cam phase Cain such that it converges to the target cam phase Cain_cmd; the urging force Frs of the return spring 38 acts to hold the cam phase Cain at the aforementioned maximum retard value Cainrt; and the urging force Fvvs of the valve spring 8 acts to periodically fluctuate the cam phase Cain. In other words, the urging force Frs of the return spring 38 acts to restrain periodic fluctuations in the cam phase Cain which is caused by the urging force Fvvs of the valve spring 8, i.e., fluctuations in the cam phase Cain.

On the other hand, when the spring constant of the return spring 38 is set to a small value for purposes of increasing the efficiency of the engine 3 as described above, fluctuations in the cam phase Cain caused by disturbance become extremely large because the arm 35a is in a very instable state, just like it is floating in the air. In this embodiment, from the foregoing technical viewpoints, the control apparatus 1 is configured in the following manner in order to restrain the aforementioned fluctuations in the cam phase Cain without employing the return spring 38 having a large spring constant.

Figure 9:
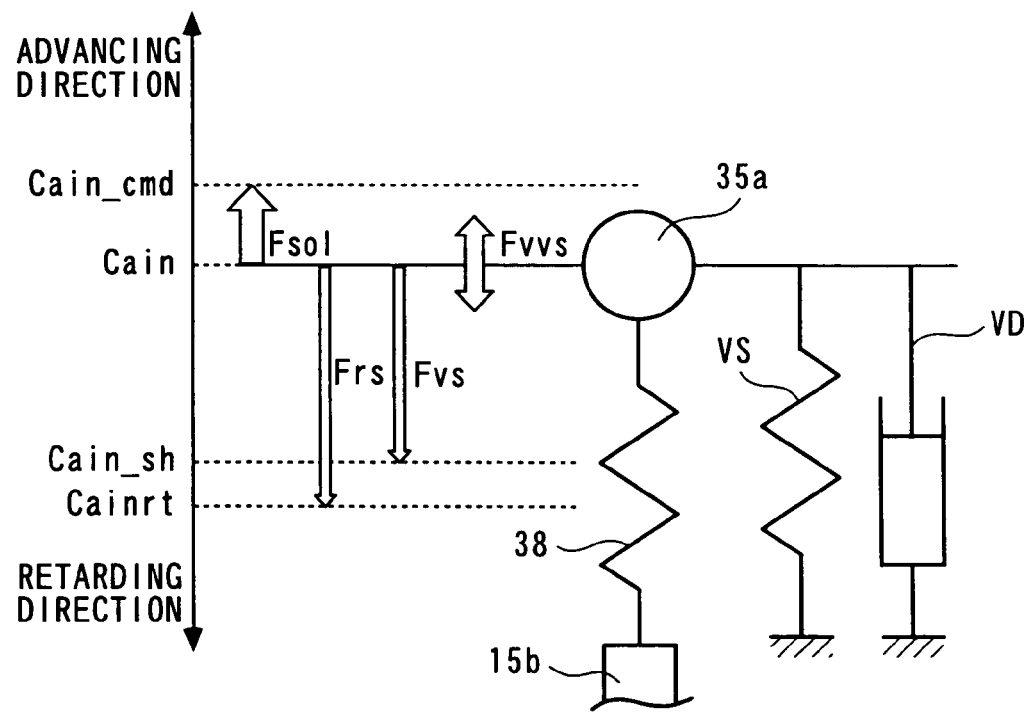
FIG. 9 is a diagram for describing the concept of the present invention.

Specifically, as illustrated in FIG. 9, a virtual spring VS for urging the arm 35a with a virtual spring force Fvs (virtual interfering force), and a virtual damper VD acting on the arm 35a as a damper with reference to a predetermined value Cain_sh are virtually arranged in parallel with the return spring 38, such that the cam phase Cain is held at the predetermined value Cain_sh. These virtual spring VS and virtual damper VD are implemented by controlling the braking force Fsol such that the cam phase Cain converges to the predetermined value Cain_sh closer to the maximum delay value Caianrt, i.e., by including the virtual spring force Fvs and a damping effect of the virtual damper VD in the braking force Fsol. Then, the braking force Fsol is further controlled such that the cam phase Cain converges to the target cam phase Cain_cmd in a state where the virtual spring force Fvs and the damping effect of the virtual damper VD are in action.

Figure 10:
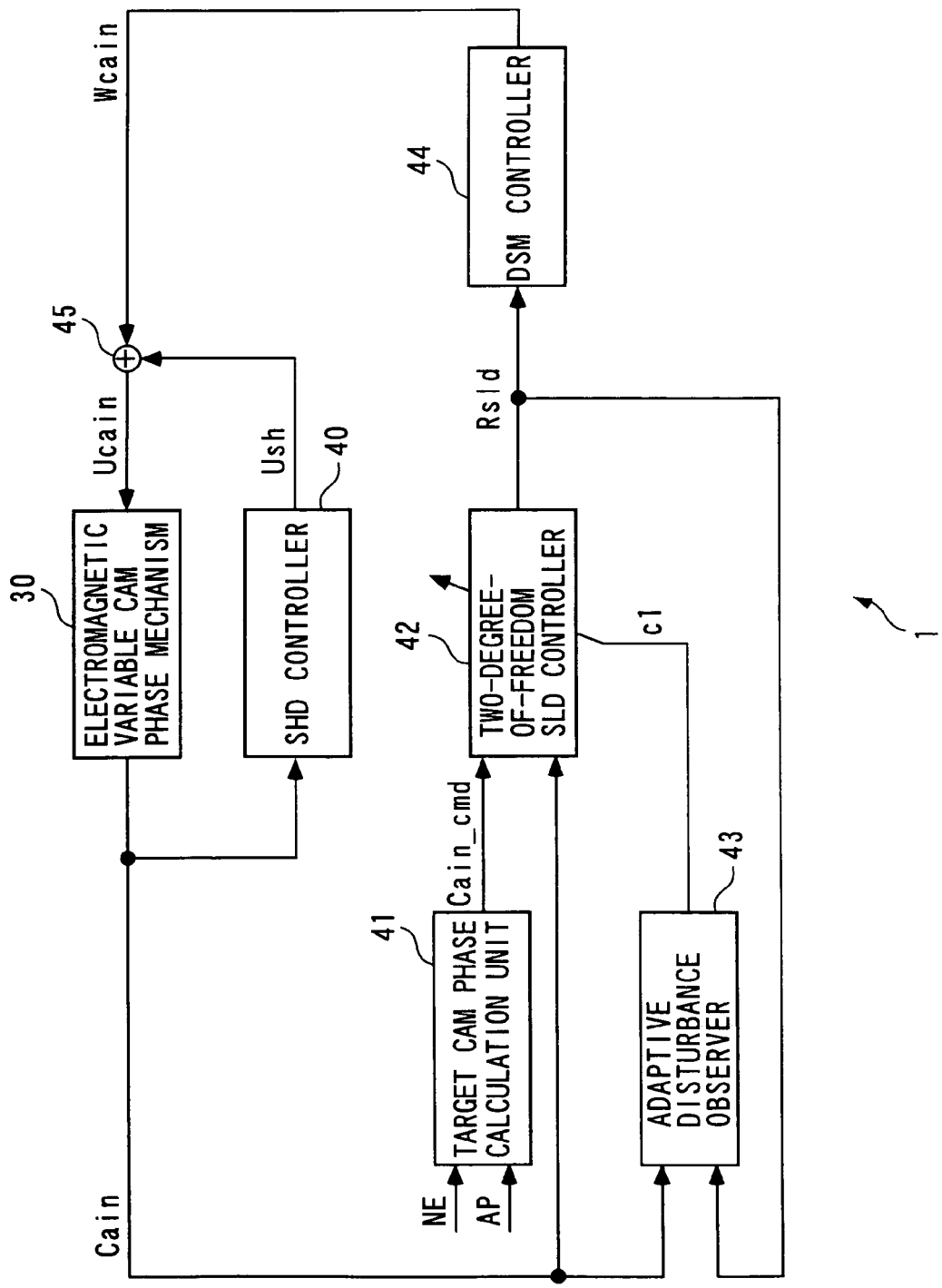
FIG. 10 is a block diagram illustrating the configuration of a control apparatus according to a first embodiment of the present invention.

Specifically, as illustrated in FIG. 10, the control apparatus 1 comprises an SHD controller 40, a target cam phase calculation unit 41, a two-degree-of-freedom SLD controller 42, an adaptive disturbance observer 43, a DSM controller 44, and an adder element 45. These components are all implemented by the ECU 2.

The control apparatus 1 calculates the control input Ucain in the following manner, and applies the calculated control input Ucain to the electromagnets 33a of the electromagnetic variable cam phase mechanism 30 to control the cam phase Cain such that it converges to the target cam phase Cain_cmd.

First, the SHD controller 40 calculates a virtual interference input Ush in accordance with the cam phase Cain and the predetermined value Cain_sh. In this embodiment, the SHD controller 40 corresponds to virtual interference input calculating means and changing rate calculating means.

Also, the target cam phase calculation unit 41 calculates the target cam phase Cain_cmd in accordance with the engine rotational speed NE and the accelerator opening AP. Details on a method of calculating the target cam phase Cain_cmd will be described later. Further, the two-degree-of-freedom SLD controller 42 calculates an SLD control input Rsld in accordance with the target cam phase Cain_cmd and the cam phase Cain by executing a control algorithm, later described. In this embodiment, the target cam phase calculating unit 41 corresponds to target value setting means, and the two-degree-of-freedom SLD controller 42 corresponds to virtual control input calculating means.

Further, the adaptive disturbance observer 43 calculates a disturbance estimate c1 for an enlarged control object, later described, by executing an identification algorithm, later described. This disturbance estimate c1 is used by the two-degree-of-freedom SDL controller 42 to calculate the SLD control input Rsld. In this embodiment, the adaptive disturbance observer 43 corresponds to disturbance estimate calculating means.

Also, the DSM controller 44 calculates a virtual control input Wcain based on the SLD control input Rsld by executing a control algorithm, later described. Then, the adder element 45 calculates the control input Ucain by adding the virtual control input Wcain and the virtual interference input Ush. In this embodiment, the DSM controller 44 corresponds to virtual control input calculating means.

Next, the SHD controller 40 will be described. The SHD controller 40 calculates the virtual interference input Ush in accordance with a control algorithm represented by the following equations (1)-(3) such that the cam phase Cain converges to the predetermined value Cain_sh:

$$Ush(k) = -Ksh \cdot Xsh(k) - Dsh \cdot DXsh(k) \quad (1)$$

$$Xsh(k) = Cain(k) - Cain\_sh \quad (2)$$

$$DXsh(k) = Xsh(k) - Xsh(k-1) \quad (3)$$

where Ksh and Dsh in Equation (1) represent a predetermined virtual spring constant and a virtual damping coefficient, respectively. Also, as is apparent from Equations (2) and (3), Xsh represents a deviation of the cam phase Cain from a predetermined value Cain_sh, and DXsh represents a changing rate of the deviation Xsh. In other words, in Equation (1), Ksh·Xsh and Dsh·DXsh correspond to the virtual spring force Fvs and the damping effect of the virtual damper VD, respectively. Further, the predetermined value Cain_sh is set to a value slightly advanced from the maximum retard value Cainrt. Each of discrete data followed by a suffix (k) indicates data sampled (or calculated) at a predetermined first period ΔTc (for example, 5 msec), and the letter k represents the order of the sampling period of each discrete data. For example, k indicates a value sampled at the current sampling timing, and k−1 indicates a value sampled at the preceding sampling timing. This aspect is also applied to the following discrete data. Also, in the following description, the suffix (k) in each discrete data is omitted as appropriate.

Further, the first period ΔTc is set to an extremely short period. In this way, a high-frequency virtual spring force Fvs is produced, thus making it possible to restrain fluctuations in the cam phase Cain due to high-frequency periodic disturbance caused by the valve spring 8 without fail.

Next, the aforementioned two-degree-of-freedom SLD controller 42 will be described. The two-degree-of-freedom SLD controller 42 assumes the electromagnetic variable cam phase mechanism 30 applied with the virtual interference input Ush as an enlarged control object, and calculates the SLD control input Rsld in accordance with a target value filter type two-degree-of-freedom sliding mode control algorithm as represented by the following Equations (4)-(9) such that the output of the enlarged control object, i.e., the cam phase Cain applied with the virtual interference input Ush, converges to the target cam phase Cain_cmd.

$$\text{Cain\_cmd\_f}(k) = -R \cdot \text{Cain\_cmd\_f}(k-m) + (1+R)\text{Cain\_cmd}(k) \quad (4)$$

$$Rsld(k) = Req(k) + Rrch(k) \quad (5)$$

$$Req(k) = \quad (6)$$
$$\frac{1}{b1}\{(1 - a1 - S)\text{Cain}(k) + (S - a2)\text{Cain}(k-m) - b2 \cdot Rsld(k-m) -$$
$$c1(k) + \text{Cain\_cmd\_f}(k) + (S-1)\text{Cain\_cmd\_f}(k-m) -$$
$$S \cdot \text{Cain\_cmd\_f}(k-2m)\}$$

$$Rrch(k) = \frac{-Krch}{b1} \cdot \sigma s(k) \quad (7)$$

$$\sigma s(k) = e(k) + S \cdot e(k-m) \quad (8)$$

$$e(k) = \text{Cain}(k) - \text{Cain\_cmd\_f}(k-m) \quad (9)$$

This control algorithm first calculates a filter value Cain_cmd_f for the target cam phase in accordance with a target value filter algorithm, i.e., a primary delay filter algorithm represented by Equation (4). In Equation (4), R represents a target value filter setting parameter, and is set to a value which satisfies a relationship $-1<R<0$.

Next, the SLD control input Rsld is calculated in accordance with the sliding mode control algorithm as represented by Equations (5)-(9). Specifically, as shown in Equation (5), SLD control input Rsld is calculated by adding an equivalent control input Req and a reaching law input Rrch.

The equivalent control input Req is calculated by Equation (6). In Equation (6), a1, a2, b1, b2 represent model parameters for an enlarged control object model in Equation (10), later described, and are set to predetermined values through a simulation, identification, or the like. Alternatively, the model parameters a1, a2, b1, b2 may be sequentially identified by an on-board identifier. In addition, c1 represents a disturbance estimate for compensating for disturbance and modeling errors, and is calculated by the adaptive disturbance observer 43. Further, S represents a switching function setting parameter, and is set to a value which satisfies a relationship $-1<R<S<0$.

On the other hand, the reaching law input Urch is calculated by Equation (7). In Equation (7), Krch represents a predetermined reaching law gain, and as represents a switching function which is defined as in Equation (8). E in Equation (8) represents a following error calculated by Equation (9).

The foregoing equations (4)-(9) are derived in the following manner. First, when the enlarged control object is modeled as a discrete time system model which is applied with the virtual control input Wcain, the following Equation (10) is derived:

$$\text{Cain}(n) = a1 \cdot \text{Cain}(n-1) + \quad (10)$$
$$a2 \cdot \text{Cain}(n-2) + b1 \cdot Wcain(n-1) + b2 \cdot Wcain(n-2)$$

where each discrete data with a suffix (n) indicates data sampled (or calculated) at a second predetermined period $\Delta Tm$ (for example, 30 msec), and the letter n indicates the order of the sampling period of each discrete data. The second period $\Delta Tm$ is longer than the first period $\Delta Tc$, and is set to a value which satisfies $\Delta Tm = m \cdot \Delta Tc$ (m is an integer), for example, to 30 msec. The second period $\Delta Tm$ is set in accordance with a response speed of the electromagnetic variable cam phase mechanism 30 through a simulation, identification, and the like.

Substituting the suffix (k) for the suffix (n) in the aforementioned Equation (10), the following Equation (11) is derived from the relationship $\Delta Tm = m \cdot \Delta Tc$:

$$\text{Cain}(k) = a1 \cdot \text{Cain}(k-m) + a2 \cdot \text{Cain}(k-2m) + \quad (11)$$
$$b1 \cdot Wcain(k-m) + b2 \cdot Wcain(k-2m)$$

Further, as will be later described, since the virtual control input Wcain is calculated by the DSM controller 44 based on the SLD control input Rsld, the following Equation (12) is derived by substituting the SLD control input Rsld for the virtual control input Wcain in the aforementioned Equation (11), and adding the disturbance estimate c1:

$$\text{Cain}(k+m) = a1 \cdot \text{Cain}(k) + \quad (12)$$
$$a2 \cdot \text{Cain}(k-m) + b1 \cdot Rsld(k) + b2 \cdot Rsld(k-m) + c1(k)$$

Based on the model of Equation (12), as the target value filter type two-degree-of-freedom sliding mode control theory is applied such that the cam phase Cain converges to the target cam phase Cain_cmd, the aforementioned Equations (4)-(9) are derived.

According to the control algorithm of the two-degree-of-freedom SLD controller 42, a converging speed of the cam phase Cain to the target cam phase Cain_cmd, converging behavior, and disturbance restraining capabilities can be ensured at a high level. Specifically, the target value filter algorithm represented by Equation (4) can freely set a converging speed by arbitrarily setting the target value filter setting parameter R within a range of $-1<R<0$. Also, the sliding mode control algorithm represented by Equations (5)-(9) can restrain the influence of modeling errors and disturbance with the disturbance estimate c1, and can freely specify a converging behavior and disturbance restraining capabilities by arbitrarily setting the switching function setting parameter S within a range of $-1<R<S<0$.

The adaptive disturbance observer 43 calculates the disturbance estimate c1 for the cam phase control in order to compensate for the modeling errors and disturbance. Specifically, the disturbance estimate c1 is calculated in accordance with the cam phase Cain and SLD control input Rsld by executing an identification algorithm based on a fixed gain method, represented by the following Equations $$c1(k) = c1(k-m) + \frac{P}{1+P} \cdot e\_dov(k) \quad (13)$$

$$e\_dov(k) = Cain(k) - Cain\_hat(k) \quad (14)$$

$$Cain\_hat(k) = a1 \cdot Cain(k-m) + a2 \cdot Cain(k-2m) + \\ b1 \cdot Rsld(k-m) + b2 \cdot Rsld(k-2m) + c1(k-m) \quad (15)$$

Here, in Equation (13), P represents a predetermined identification gain, and e_dov an identification error, respectively. The identification error e_do is calculated by Equation (14). Also, Cain_hat in Equation (14) represents an identified value for the cam phase Cain, and is calculated by Equation (15).

These Equations (13)-(15) are derived in the following manner. Specifically, in the aforementioned Equation (12), the left side is replaced by the identified value Cain_hat for the cam phase, and the identification algorithm of the fixed gain method based on statistical processing is applied based on the thus replaced model to minimize the deviation of the identified value Cain_hat for the cam phase from the cam phase Cain, resulting in the derivation of the aforementioned Equations (13)-(15). The disturbance estimate c1 is calculated by the foregoing Equations (13)-(15) as a value which can appropriately compensate for the modeling error and disturbance.

The DSM controller 44 calculates the virtual control input Wcain based on the SLD control input Rsld by executing a control algorithm based on a $\Delta\Sigma$ modulation algorithm represented by the following equations (16)-(21):

$$r1(k)=Rsld(k)-W\_oft \quad (16)$$

$$r2(k)=Lim(r1(k)) \quad (17)$$

$$\delta(k)=r2(k)-Wcain'(k-1) \quad (18)$$

$$\sigma(k)=\sigma(k-1)+\delta(k) \quad (19)$$

$$Wcain'(k)=fnl(\sigma(k)) \quad (20)$$

$$Wcain(k)=Wcain'(k)+W\_oft \quad (21)$$

W_oft in the foregoing Equation (16) represents a predetermined offset value (for example, six) In Equation (17), Lim(r1($k$)) represents a limited value for the SLD control input Rsld resulting from limit processing, and is specifically calculated by limiting the SLD control input Rsld within a range defined by a predetermined lower limit value rmin and upper limit value rmax. Specifically when r1($k$) <rmin, Lim(r1($k$))=rmin; when rmin$\leq$r1($k$)$\leq$rmax, Lim(r1($k$))=r1($k$); and when r1($k$)>rmax, Lim(r1($k$))=rmax. These lower limit value rmin and upper limit value rmax are set to a predetermined negative value and positive value, the absolute values of which are equal to each other (for example, −1 and 1, respectively).

Also, in the aforementioned Equation (20), fnl($\sigma$(k)) is a nonlinear function, the value of which satisfies fnl($\sigma$(k))=Rd when $\sigma$(k)$\geq$0; and fnl($\sigma$(k))=−Rd when $\sigma$(k)<0 (for reference, when $\sigma$(k)=0, fnl($\sigma$(k)) may be set to zero). Also, the value Rd is set to a predetermined positive value (for example, 1.5) which satisfies a relationship represented by Rd>|r2($k$)| at all times.

It should be noted that the virtual control input Wcain is calculated by executing the foregoing control algorithm based on the $\Delta\Sigma$ modulation algorithm in order to compensate the electromagnetic variable cam phase mechanism 30 for the hysteresis characteristic exhibited thereby.

By calculating the virtual interference input Ush in the foregoing manner such that the cam phase Cain converges to the predetermined value Cain_sh, the virtual spring force Fvs and the damping effect of the virtual damper VD, which act to hold the cam phase Cain at the predetermined value Cain_sh is included in the braking force Fsol. In this way, even when the spring constant of the return spring 38 is set to a small value, the virtual spring force Fvs and the damping effect of the virtual damper VD act on the arm 35a in addition to the urging force Frs of the return spring 38, thus making it possible to restrain fluctuations in the cam phase Cain caused by the urging force Fvvs of the valve spring 8. Also, based on this fact, the spring constant of the return spring 38 is set to a small value in this embodiment, so that a high efficiency can be achieved for the engine 3.

Figure 11:
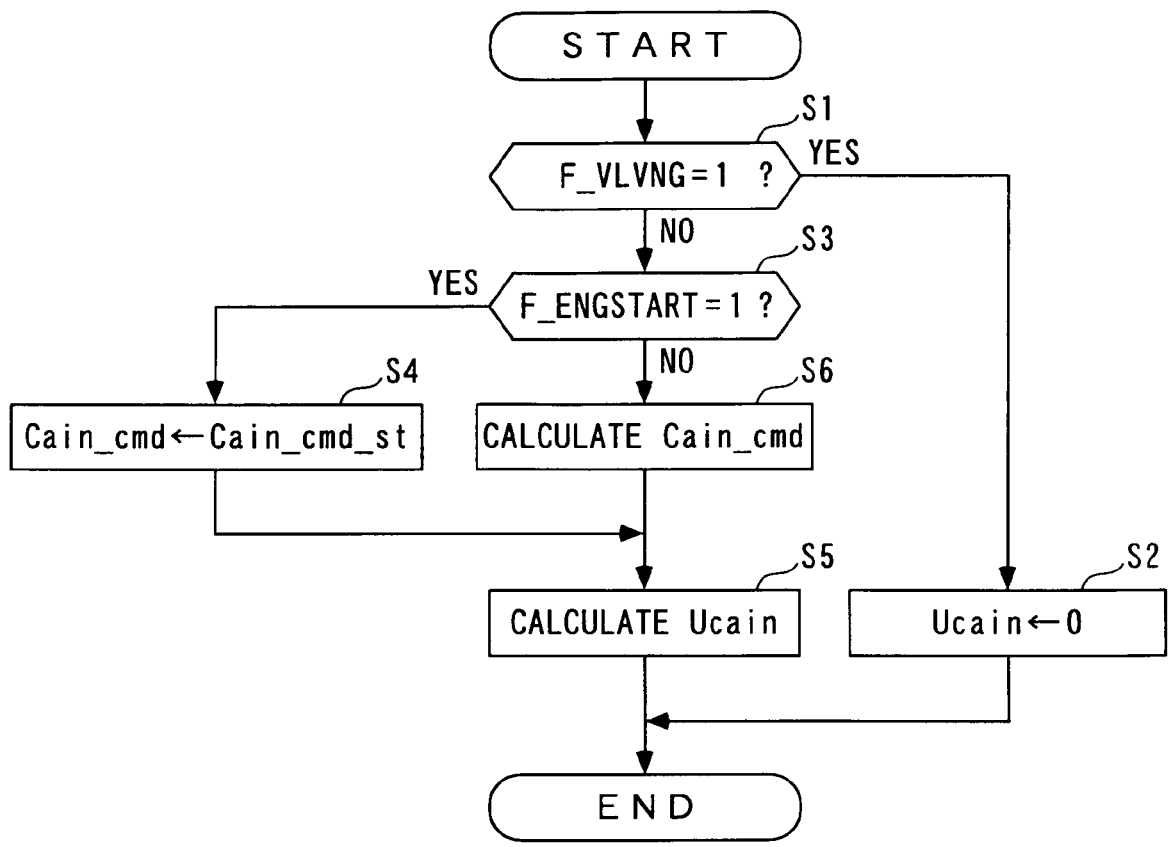
FIG. 11 is a flow chart illustrating a cam phase control routine.

In the following, a routine for controlling the cam phase Cain, executed by the ECU 2, will be described with reference to FIG. 11. A control cycle of this routine is set to the first period $\Delta$Tc. First, it is determined at step 1 whether or not a fault flag FF_VLVNG is "1." This fault flag F_VLVNG is set to "1" when the electromagnetic variable cam phase mechanism 30 fails in a fault determination routine (not shown).

If the answer to step 1 is YES, indicating that the electromagnetic variable cam phase mechanism 30 fails, the ECU 2 sets the control input Ucan to zero (step 2), followed by termination of the cam phase control routine. As a result, the cam phase Cain is controlled to be equal to the maximum retard value Cainrt.

On the other hand, if the answer to step 1 is NO, indicating that the electromagnetic variable cam phase mechanism 30 is normal, it is determined whether or not an engine start flag F_ENGSTART is "1" (step 3). This engine start flag F_ENGSTART is set by determining whether or not the engine start control is under way, i.e., whether or not the engine is cranking in accordance with the engine rotational speed NE and the output signal of the IG/SW 27 in a determination routine (not shown), and is set to "1" when the engine start control is under way.

If the answer to step 3 is YES, indicating that the engine start control is under way, the ECU 2 sets the target cam phase cain_cmd to a predetermined starting value Cain_cmd_st (step 4). Next, the ECU 2 calculates the control input Ucain by adding the virtual interference input Ush calculated by the aforementioned equations (1)-(3) and the virtual control input Wcain calculated by the aforementioned equations (4)-(21) (step 5), followed by termination of the cam phase control routine.

Figure 12:
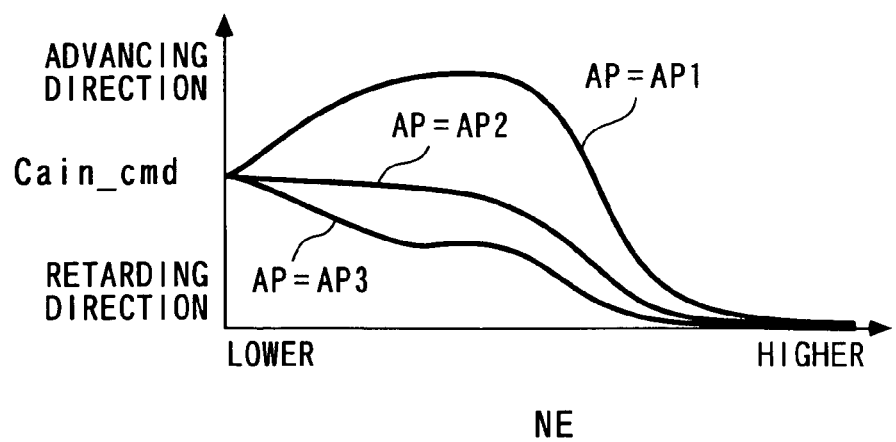
FIG. 12 is a diagram showing an exemplary map for calculating a target cam phase Cain_cmd, which is used in the routine of FIG. 11.

On the other hand, if the answer to step 3 is NO, indicating that the engine start control is not under way, the ECU 2 calculates the target cam phase Cain_cmd in accordance with the engine rotational speed NE and accelerator opening AP by searching a map shown in FIG. 12 (step 6). Next, the ECU 2 executes step 5 mentioned above. In FIG. 12, AP1-AP3 represent predetermined values of the accelerator opening AP, respectively, and are set in a relationship represented by AP1<AP2<AP3. In this map, the target cam phase Cain_cmd is set to a more advanced value when the engine 3 is lightly loaded and when the engine rotational speed NE is low or middle, than other instances. This is intended to improve the fuel economy by controlling the cam phase Cain to advance the cam phase Cain to increase the amount of internal EGR gas, thereby reducing a pumping loss when the engine 3 is in such an operating condition. The target cam phase Cain_cmd is set to a more retarded value as the engine rotational speed NE is lower in order to ensure stable combustion, as well as good exhaustion characteristics and drivability when the engine 3 is lightly loaded and when the engine rotational speed NE is extremely low or low.

Figure 13:
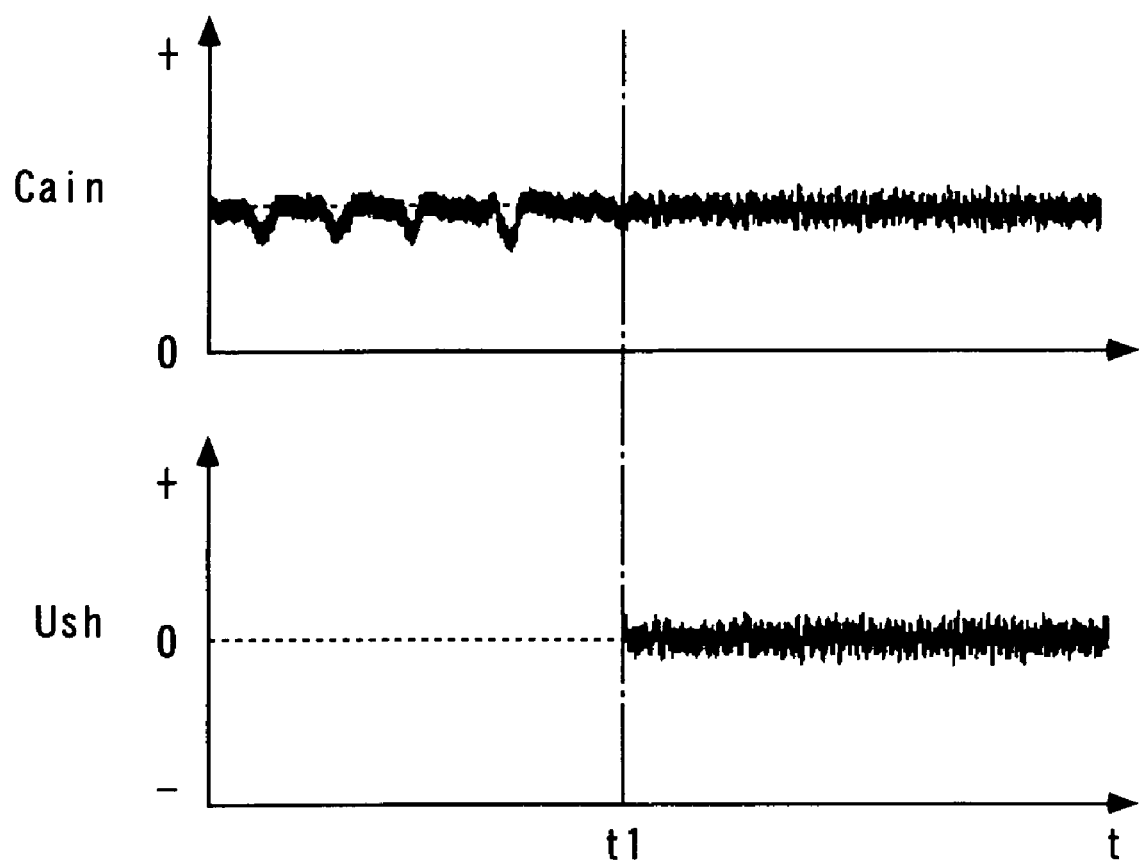
FIG. 13 is a diagram showing the result of the control conducted by the control apparatus according to the first embodiment of the present invention.

Next, a description will be made on the result of controlling the cam phase Cain by the control apparatus 1. FIG. 13 shows an exemplary result of the control when the target cam phase Cain_cmd is held at a constant value. As illustrated in FIG. 13, when the virtual interference input Uch is not applied (up to time t1), the cam phase Cain is periodically fluctuating due to the influence of the aforementioned periodic disturbance caused by the valve spring 8. In contrast, when the virtual interference input Uch is applied (after time t1), it can be confirmed that the fluctuations disappeared and the cam phase Cain is stabilized.

As described above, according to this embodiment, since the virtual spring force Fvs is generated from the virtual interference input Ush to act to hold the cam phase Cain at the predetermined value Cain_sh, fluctuations in the cam phase Cain can be restrained. Since this can restrain fluctuations in the cam phase Cain caused by high-frequency periodic disturbance, high stability can be ensured for the cam phase Cain. Also, since the fluctuations in the cam phase Cain can be restrained as described above, the cam phase Cain can be accurately controlled even if a higher convergence speed and a better convergence behavior are specified in the target value two-degree-of-freedom type sliding mode control algorithm described above, without causing the resonance of the cam phase Cain with the high-frequency fluctuations. Based on the foregoing fact, a higher convergence speed and a better convergence behavior are specified in the target value two-degree-of-freedom type sliding mode control in this embodiment. Since the high stability and control accuracy can be ensured for the cam phase Cain, in combination with the setting of the target cam phase Cain_cmd based on the aforementioned map of FIG. 12, the control apparatus 1 can achieve good fuel economy, exhaustion characteristics, and drivability.

Further, since the disturbance estimate c1 is calculated while fluctuations in the cam phase Cain are restrained by the virtual interference input Ush, the disturbance can be estimated with improved accuracy resulting from the disturbance estimate c1. Consequently, higher stability and control accuracy can be ensured for the cam phase Cain.

Also, the first period $\Delta Tc$, at which the virtual interference input Ush is calculated, is set to a value different from the second period $\Delta Tm$ which is the sampling period in the model (represented by the aforementioned Equation (10)) for calculating the virtual control input Wcain. This can prevent the cam phase Cain from losing the stability due to the resonance of the virtual interference input Ush with the virtual control input Wcain.

Further, since the virtual interference input Ush forces the damping effect of the virtual damper based on the predetermined value Cain_sh to act on the cam phase Cain, a changing speed of the cam phase Cain due to disturbance can be restrained, thus further restraining high-frequency fluctuations in the cam phase Cain having a higher changing speed.

While in the foregoing embodiment, the predetermined value Cain_sh is set to a value slightly advanced from the maximum retard value Cainrt, the predetermined value Cain_sh may be set to the maximum retard value Cainrt when the return spring 38 has an extremely small spring constant. Conversely, if the spring constant is large enough to cause an excessively high changing speed of the cam phase Cain toward the retard side, the predetermined value Cain_sh may be set to a value near the maximum advance value Cainad. In this embodiment, since the predetermined value Can_sh is set as described above, the arm 35a can be prevented from colliding against the maximum retard stopper 36.

Figure 14:
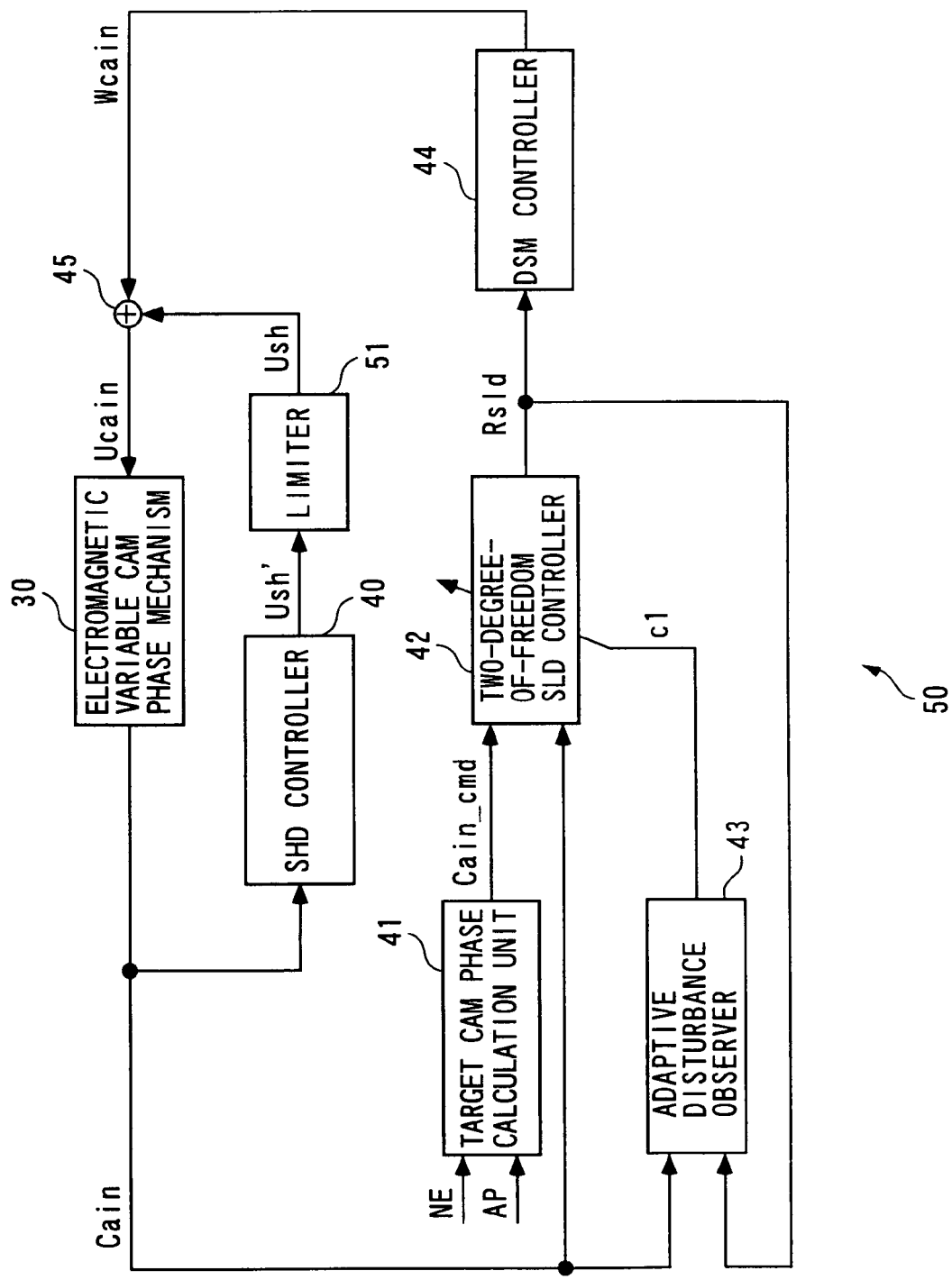
FIG. 14 is a block diagram illustrating the configuration of a control apparatus according to a second embodiment of the present invention.

Referring next to FIG. 14, a description will be made on a control apparatus 50 according to a second embodiment of the present invention. The second embodiment differs from the first embodiment only in that after the virtual interference input Ush has been calculated, the virtual interference input Ush undergoes predetermined limit processing. In FIG. 14, components in the control apparatus 50 identical to those in the control apparatus 1 according to the first embodiment are designated the same reference numerals. As illustrated in FIG. 14, since the second embodiment differs only in that a limiter 51 is added to the control apparatus 1, the following description will be centered on the limiter 51. It should be noted that the limiter 51 is implemented by the ECU 2.

The limiter 51 captures the virtual interference input calculated by the SHD controller 40 as a preliminary value Ush'. Then, the limiter 51 performs the limit processing on the preliminary value Ush' as represented by the following equations (22)-(24) to calculate a virtual interference input Ush. It should be noted that the preliminary value Ush' corresponds to the virtual interference input Ush in FIG. 10 calculated by the SHD controller 40, but is so named in order to uniformly express the virtual interference input applied to the adder element 45 as the "virtual interference input Ush."

$$Dush(k)=Ush'(k)-Ush(k-1) \quad (22)$$

$$Dush'(k)=Lim(Dush(k)) \quad (23)$$

$$Ush(k)=Ush(k-1)+Dush'(k) \quad (24)$$

Here, Dush in Equation (22) represents a changing rate of the virtual interference input Ush before the limit processing (hereinafter called the "input changing rate"), as is apparent from the calculating method. Lim(Dush(k)) represents a value resulting from the following restriction imposed on the input changing rate Dush.

Specifically, Lim(Dush(k)) is set to Dush_H when Dush(k)$\geq \epsilon H$; to Dush(k) when $\epsilon L <$Dush(k)$< \epsilon H$; and to Dush_L when Dush(k)$\leq \epsilon L$, respectively. Here, $\epsilon H$ represents an increase side criterion (predetermined changing rate) and is set to a predetermined positive value, while $\epsilon L$ represents a decrease side criterion (predetermined changing rate) and is set to a negative value, the absolute value of which is equal to that of the increase side criterion $\epsilon H$. Also, these increase side criterion $\epsilon H$ and decrease side criterion $\epsilon L$ are set to such values that permit a determination as to whether or not the virtual spring force Fvs is periodically increasing or decreasing in response to disturbance. Further, Dush_H represents a predetermined increase restriction value (restriction value), and is set to a positive value smaller than the increase side criterion $\epsilon H$ (Dush_H$<\epsilon H$). Dush_L in turn represents a predetermined decrease restriction value (restriction value), and is set to a negative value, the absolute value of which is larger than that of the decrease side criterion $\epsilon L$ (|Dush_L|$>|\epsilon L|$). In other words, the absolute value of the decrease restriction value Dush_L is set to a value larger than the increase restriction value Dush_H.

Then, as represented by the aforementioned Equation (24), the current virtual interference input Ush(k) is calculated by adding the restricted value Dush'(k) calculated by the aforementioned restriction and the preceding value Ush (k−1) of the virtual interference input.

As described above, the limiter 51 delivers the current preliminary value Ush'(k) captured from the SHD controller 40 as the current virtual interference input Ush(k) as it is when the input changing rate Dush lies between the increase side criterion εH and the decrease side criterion εL (εL<Dush<εH). Otherwise, the limiter 51 restricts the input changing rate Dush to the increase restriction value Dush_H when the virtual interference input Ush is increasing, and to the decrease restriction value Dush_L when the virtual interference input Ush is decreasing, respectively.

As described above, according to this embodiment, the input changing rate Dush is limited by the limit processing when the input changing rate Dush is equal to or higher than the increase side criterion εH or when it is equal to or lower than the decrease side criterion εL, on the assumption that the virtual spring force Fvs is periodically increasing or decreasing in response to periodic disturbance. Also, in this event, the absolute value of the increase restriction value Dush_H to which the input changing rate Dush is restricted when the virtual interference input Ush is increasing differs from the absolute value of the decrease restriction value Dush_L to which the input changing rate Dush is restricted when the virtual interference input Ush is decreasing. Since this difference can avoid periodic increasing or decreasing behaviors of the virtual spring force Fvs in response to disturbance, the deviation can be prevented from excessively growing or diverging.

Also, the absolute value of the increase restriction value Dush_H is set to a value smaller than the absolute value of the decrease restriction value Dush_L. In this way, when the virtual interference input Ush is increasing, i.e., when an action is made to advance the cam phase Cain, the cam phase Cain can be prevented from excessively advancing by imposing a more tight restriction to the input changing rate Dush. It is therefore possible to prevent instable combustion due to an excessive increase in the amount of internal EGR gas.

In the first and second embodiments described above, the control apparatus controls the cam phase Cain of the intake cam shaft 5. Alternatively or additionally, the control apparatus may control the cam phase of the exhaust cam shaft 10. Also, in these embodiments, the control apparatus employs an electromagnetic variable cam phase mechanism, but may employ a hydraulic one instead, as a matter of course.

Further, in the second embodiment, the absolute value of the increase restriction value Dush_H, to which the input changing rate Dush is restricted when the virtual interference input Ush is increasing, is set to a smaller value than the absolute value of the decrease restriction value Dush_L to which the input changing rate Dush is restricted when the virtual interfere input Ush is decreasing. The absolute values of these restriction values Dush_H and Dush_L are only required to be set to values different from each other, and may be set in a magnitude relationship reverse to the foregoing in accordance with this policy, as a matter of course.

Figure 15:
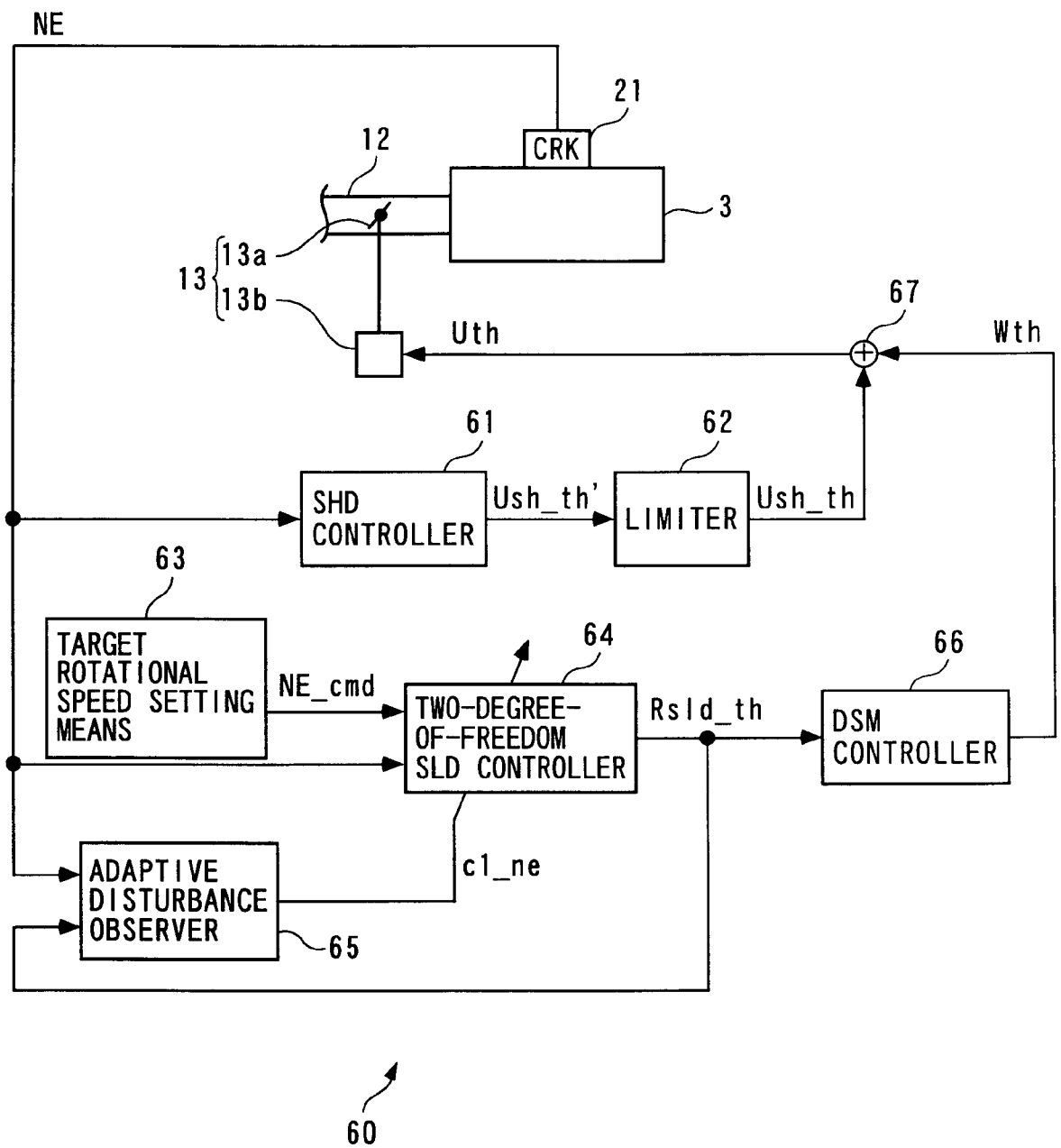
FIG. 15 is a block diagram illustrating the configuration of a control apparatus according to a third embodiment of the present invention.

Referring next to FIG. 15, a description will be made on a control apparatus 60 according to a third embodiment of the present invention. The control apparatus 60 controls the engine rotational speed NE such that it converges to a target rotational speed NE_cmd (target value), later described, during an idling operation, and executes control processing when the accelerator opening AP and the engine rotational speed NE are smaller than a predetermined value AP_IDLE and a predetermined value AP_NE_IDLE for determining an idling operation, respectively. Specifically, the control apparatus 60 comprises an SHD controller 61, a limiter 62, a target rotational speed setting unit 63, a two-degree-of-freedom SLD controller 64, an adaptive disturbance observer 65, a DSM controller 66, and an adder element 67.

The SHD controller 61 is configured substantially in a similar manner to the aforementioned SHD controller 40, and specifically, calculates a virtual interference input Ush_th by executing a control algorithm represented by the following equations (25)-(27) such that the engine rotational speed NE converges to a predetermined value NE_sh. In this embodiment, the SHD controller 61 corresponds to virtual interference input calculating means and changing rate calculating means.

$$\text{Ush\_th}(k) = -\text{Ksh\_ne} \cdot \text{Xsh\_ne}(k) - \text{Dsh\_ne} \cdot \text{DXsh\_ne}(k) \quad (25)$$

$$\text{Xsh\_ne}(k) = NE(k) - \text{NE\_sh} \quad (26)$$

$$\text{DXsh\_ne}(k) = \text{Xsh\_ne}(k) - \text{Xsh\_ne}(k-1) \quad (27)$$

Here, Ksh_ne and Dsh_ne in Equation (25) represent a predetermined virtual spring constant and a virtual damping coefficient, respectively. The predetermined value NE_sh is set to a value larger than the target rotational speed NE_cmd and smaller than the predetermined value NE_IDLE. Further, as is apparent from the foregoing equations (25)-(27), Ksh_ne·Xsh_ne and Dsh_ne·DXsh_ne correspond to a virtual spring force Fvs and a damping effect of a virtual damper VD, respectively. The virtual spring force Fvs and the damping effect of the virtual damper Vd in this event act to hold the engine rotational speed NE at the predetermined value NE_sh.

The limiter 62 is configured substantially in a similar manner to the aforementioned limiter 51. Specifically, the limiter 62 captures a virtual interference input calculated by the SHD controller 61 as a preliminary value Ush_th'. Then, the limiter 62 performs the limit processing on the preliminary value Ush' as represented by the following equations (28)-(30) to calculate a virtual interference input Ush_th. In this embodiment, the limiter 62 corresponds to changing rate calculating means and changing rate restricting means.

$$Dush\_th(k) = Ush\_th'(k) - Ush\_th(k-1) \quad (28)$$

$$Dush\_th'(k) = Lim(Dush\_th(k)) \quad (29)$$

$$Ush\_th(k) = Ush\_th(k-1) + Dush\_th'(k) \quad (30)$$

In this way, the input changing rate Dush_th is limited by the limit processing when the input changing rate Dush_th is equal to or higher than the increase side criterion εH_th (predetermined changing rate) or when it is equal to or lower than the decrease side criterion εL_sh (predetermined changing rate), on the assumption that the virtual spring force Fvs is periodically increasing or decreasing in response to periodic disturbance. Also, in this event, the input changing rate Dush_th is restricted to a predetermined positive increase restriction value Dush_H_th (restriction value) when the virtual interference input Ush_th is increasing, and restricted to a predetermined negative decrease restriction value Dush_L_th (restriction value) when the input changing rate Dush_th is decreasing. Further, the absolute value of the increase restriction value Dush_H_th is different from the absolute value of the decrease restriction value Dush_L_th, where the former is set to a value smaller than the latter.

The target rotational speed setting unit 63 sets the target rotational speed NE_cmd to a predetermined value for an idling operation (for example, 650 rmp). In this embodiment, the target rotational speed setting unit 63 corresponds to target value setting means.

The two-degree-of-freedom SLD controller 64 is configured substantially in a similar manner to the aforementioned two-degree-of-freedom SLD controller 42. Specifically, the two-degree-of-freedom SLD controller 64 assumes the engine 33 having a throttle mechanism 13 applied with the virtual interference input Ush_th as an enlarged control object, and calculates an SLD control input Rsld_th in accordance with a target value filter type two-degree-of-freedom sliding mode control algorithm represented by the following Equations (31)-(36) such that the output of the enlarged control object, i.e., the engine rotational speed NE as applied with the virtual interference input Ush_th, converges to the target rotational speed NE_cmd. In this embodiment, the two-degree-of-freedom SLD controller 64 corresponds to virtual control input calculating means.

$$NE\_cmd\_f(k) = -R\_ne \cdot NE\_cmd\_f(k-m) + (1 + R\_ne)NE\_cmd(k) \quad (31)$$

$$Rsld\_th(k) = Req\_ne(k) + Rrch\_ne(k) \quad (32)$$

$$Req\_ne(k) = \quad (33)$$
$$\frac{1}{b1\_ne}\{(1 - a1\_ne - S\_ne)NE(k) + (S\_ne - a2\_ne)NE(k-m) -$$
$$b2\_ne \cdot Rsld\_th(k-m) - c1\_ne(k) + NE\_cmd\_f(k) +$$
$$(S\_ne - 1)NE\_cmd\_f(k-m) - S\_ne \cdot NE\_cmd\_f(k-2m)\}$$

$$Rrch\_ne(k) = \frac{-Krch\_ne}{b1\_ne} \sigma s\_ne(k) \quad (34)$$

$$\sigma s\_ne(k) = e\_ne(k) + S\_ne \cdot e\_ne(k-m) \quad (35)$$

$$e\_ne(k) = NE(k) - NE\_cmd\_f(k-m) \quad (36)$$

In the foregoing manner, the SLD control input Rsld_th is calculated in a manner similar to the aforementioned equations (4)-(9). For reference, the foregoing equations (31)-(36) are derived by applying the target value filter type two-degree-of-freedom sliding mode control theory based on the model represented by the following Equation (37) such that the engine rotational speed NE converges to the target rotational speed NE_cmd:

$$NE(k+m) = a1\_ne \cdot NE(k) + a2\_ne \cdot NE(k-m) + \quad (37)$$
$$b1\_ne \cdot Rsld\_th(k) + b2\_ne \cdot Rsld\_th(k-m) + c1\_ne(k)$$

This Equation (37) is derived on the basis of the following Equation (37a) which models the enlarged control object (engine 3 applied with the virtual interference input Ush_th) as a discrete time system model which is applied with the virtual control input Wth, later described, in a manner similar to the aforementioned Equations (10)-(12):

$$NE(n) = a1\_ne \cdot NE(n-1) + a2\_ne \cdot NE(n-2) + \quad (37a)$$
$$b1\_ne \cdot Wth(n-1) + b2\_ne \cdot Wth(n-2)$$

The adaptive disturbance observer 65 is configured substantially in a similar manner to the aforementioned adaptive disturbance observer 43, and calculates a disturbance estimate c1_ne for controlling the engine rotational speed in order to compensate for modeling errors and disturbance. Specifically, the adaptive disturbance observer 65 calculates the disturbance estimate c1_ne in accordance with the engine rotational speed NE and the SLD control input Rsld_th by executing an identification method of a fixed gain method as represented by the following equations (38)-(40). In this embodiment, the adaptive disturbance observer 65 corresponds to disturbance estimate calculating means.

$$c1\_ne(k) = c1\_ne(k-m) + \frac{P\_ne}{1+P\_ne} \cdot e\_dov\_ne(k) \quad (38)$$

$$e\_dov\_ne(k) = NE(k) - NE\_hat(k) \quad (39)$$

$$NE\_hat(k) = a1\_ne \cdot NE(k-m) + a2\_ne \cdot NE(k-2m) + \quad (40)$$
$$b1\_ne \cdot Rsld\_th(k-m) + b2\_ne \cdot Rsld\_th(k-2m) + c1\_ne(k-m)$$

Thus, the disturbance estimate c1_ne is calculated in a manner similar to the aforementioned Equations (13)-(15). Like Equations (13)-(15), these Equations (38)-(40) are derived by substituting the identified value NE_hat of the engine rotational speed for the left side in the aforementioned Equation (37), and applying the identification algorithm of the fixed gain method based on statistical processing to minimize the difference between the identified value NE_hat of the engine rotational speed and the engine rotational speed NE.

The DSM controller 66 is configured substantially in a similar manner to the aforementioned DSM controller 44. Specifically, the DSM controller 66 calculates a virtual control input Wth based on the SLD control input Rsld_th by executing a control algorithm based on the ΔΣ modulation algorithm represented by the following Equations (41)-(46). In this embodiment, the DSM controller 66 corresponds to virtual control input calculating means.

$$r1\_th(k) = Rsld\_th(k) - W\_oft\_th \quad (41)$$

$$r2\_th(k) = Lim(r1\_th(k)) \quad (42)$$

$$\delta\_th(k) = r2\_th(k) - Wth'(k-1) \quad (43)$$

$$\sigma\_th(k) = \sigma\_th(k-1) + \delta\_th(k) \quad (44)$$

$$Wth'(k) = fnl(\sigma\_th(k)) \quad (45)$$

$$Wth(k) = Wth'(k) + W\_oft\_th \quad (46)$$

Thus, the DSM controller 66 calcuates the virtual control input Wth in a similar manner to the aforementioned Equations (16)-(21).

Further, the adder element 67 calculates the control input Uth by adding the virtual interference input Ush_th and the virtual control input Wth. Then, by applying the calculated control input Uth to the motor 13b of the throttle mechanism 13, the throttle valve opening is controlled such that the engine rotational speed NE converges to the target rotational speed NE_cmd.

Figure 16A:
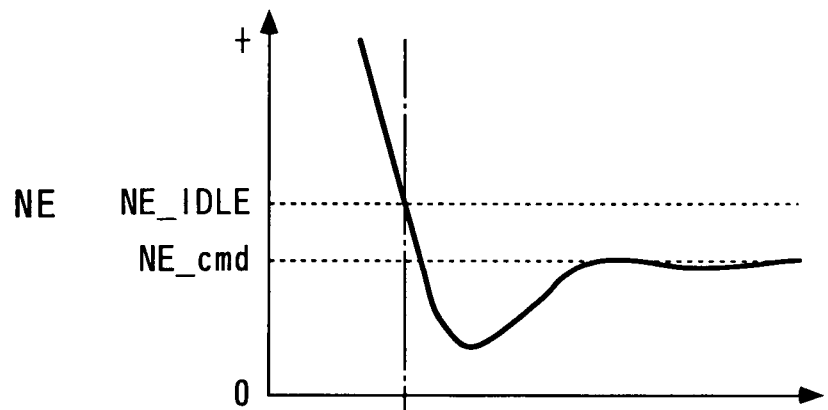
FIGS. 16A and 16B are diagrams showing an exemplary result of control using a control input Uth as it is for a virtual control input Wth (FIG. 16A), and an exemplary result of control conducted by the control apparatus according to the third embodiment of the present invention, respectively.
Figure 16B:
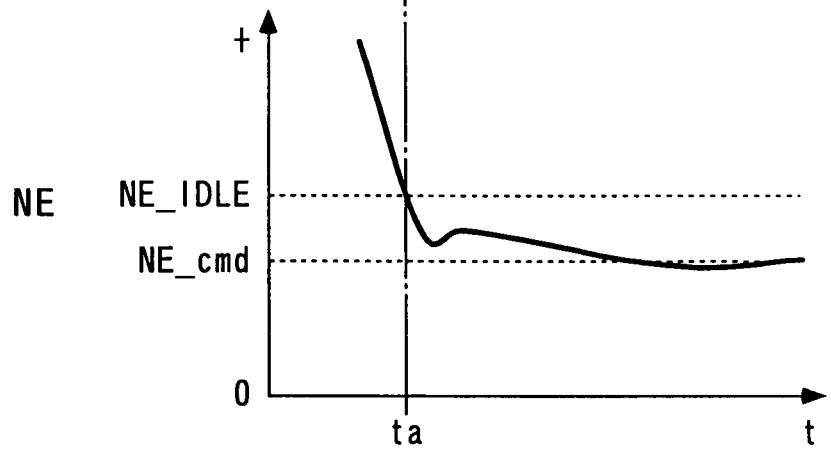

Referring next to FIGS. 16A and 16B, an exemplary result of controlling the engine rotational speed NE by the control apparatus 60 will be described together with a comparative example. The comparative example employs the virtual control input Wth as it is for the control input Uth. In the comparative example illustrated in FIG. 16A, as the idling rotational speed control is started (at time ta) in response to the engine rotational speed NE falling below the predetermined value NE_IDLE, the engine rotational speed NE once falls largely below the target rotational speed NE_cmd due to the influence of the inertia of the crank shaft $3a$ and the like, and then converges to the target rotational speed NE_cmd. In this way, in the comparative example, the inertia of the crank shaft $3a$ and the like acts on the engine rotational speed NE as instantaneous large disturbance at the start of the idling rotational speed control, causing the engine rotational speed NE to largely fall below the target rotational speed NE_cmd to instantaneously present a large deviation.

On the other hand, in the result of the control conducted by the control apparatus 60 described above, it is confirmed, as illustrated in FIG. 16B, that the engine rotational speed NE converges to the target rotational speed NE_cmd after the start of the idling rotational speed, without falling largely below the target rotational speed NE_cmd, i.e., without presenting a large deviation, thus achieving high stability and control accuracy for the idling rotational speed.

As described above, according to this embodiment, the virtual spring force Fvs is generated from the virtual interference input Ush_th to act to hold the engine rotational speed NE at the predetermined value NE_sh higher than the target rotational speed. This can restrain fluctuations in the engine rotational speed caused by disturbance, thereby making it possible to avoid the engine rotational speed NE from largely falling below the target rotational speed during an idling operation to achieve high stability and control accuracy for the engine rotational speed NE.

Also, since the disturbance estimate $c1$ is calculated while fluctuations in the engine rotational speed NE are restrained by the virtual interference input Ush_th, the disturbance can be estimated with an improved accuracy resulting from the disturbance estimate $c1$. Consequently, higher stability and control accuracy can be ensured for the engine rotational speed NE.

Further, the first period $\Delta Tc$, at which the virtual interference input Ush_th is calculated, is set to a value different from the second period $\Delta Tm$ which is the sampling period in the model (represented by the aforementioned Equation (37a)) for calculating the virtual control input Wth. This can prevent the engine rotational speed NE from losing the stability due to the resonance of the virtual interference input Ush_th with the virtual control input Wth.

Furthermore, since the virtual interference input Ush, which generates the damping effect of the virtual damper VD, forces the damping effect of the virtual damper based on the predetermined value NE_sh to act on the engine rotational speed NE, a changing speed of the engine rotational speed NE due to disturbance can be restrained, thus further restraining high-frequency fluctuations in the cam phase Cain having a higher changing speed.

In addition, the absolute value of the increase restriction value Dush_H_th to which the input changing rate Dush_th is restricted when the virtual interference input Ush_th is increasing is different from the absolute value of the decrease restriction value Dush_L_th to which the input changing rate Dush_th is restricted when the virtual interference input Ush_th is decreasing. Since this setting can avoid the virtual spring Fvs from presenting periodical increasing and decreasing behaviors in response to disturbance, the deviation can be prevented from excessively increasing or diverging.

Also, the absolute value of the increase restriction value Dush_H_th is set to a value smaller than the absolute value of the decrease restriction value. This can prevent the engine rotational speed NE from excessively increasing by further restricting the input changing rate Dush_th when the virtual interfere input Ush_th is increasing, i.e., when this is acting on the engine rotational speed NE to change it in an increasing direction. It is therefore possible to prevent a degraded fuel economy due to an unnecessarily increased engine rotational speed NE though the vehicle is stationary.

It should be understood that the present invention is not limited to the embodiments described above, but can be practiced in a variety of implementations. For example, while the predetermined response specifying control algorithm used in the first to third embodiments is the sliding mode control algorithm, the response specifying control algorithm is not so limited, but any control algorithm may be used as long as it can specify a convergence speed of an output to a target value. Also, while the predetermined two-degree-of-freedom control algorithm used in the first to third embodiments is the target value filter type sliding mode control algorithm, the two-degree-of-freedom control algorithm is not so limited, but may be implemented by a combination of a first-order delay filter algorithm with a feedback control algorithm such as a PID control algorithm.

Further, while the first period $\Delta Tc$, at which the virtual interference input Ush, Ush_th is calculated, is set to a value smaller than the second period $\Delta Tm$ which is the sampling period in the model for calculating the virtual control input Wcain, Wth in the foregoing embodiments, they are simply required to be different from each other, and their magnitude relationship may be set reverse to the foregoing, for example, in accordance with the frequency of disturbance acting on a control object, as a matter of course. Also, while the foregoing embodiments have shown examples in which the present invention is applied to control apparatuses for controlling the cam phase Cain or engine rotational speed NE, it should be understood that the present invention is not so limited but can be widely applied to control apparatuses for controlling the output of other arbitrary control objects. Furthermore, a variety of controllers 40, 42-44, 51, 61, 62, and 64-66 may be made up of electric circuits instead of the programs in the foregoing embodiments. Otherwise, details in configuration can be modified as appropriate within the scope of the invention as defined by the appended claims.

What is claimed is:

1. A control apparatus comprising:
output detecting means for detecting an output of a control object;
virtual interference input calculating means for calculating a virtual interference input applied to the control object in order to generate a virtual interfering force for holding the detected output of the control object at a predetermined value;
target value setting means for setting a target value which is a target for the output of the control object; and
virtual control input calculating means which assumes the control object applied with the virtual interference input as an enlarged control object for calculating a virtual control input applied to the enlarged control object based on a predetermined response specifying control algorithm such that an output of the enlarged control object converges to the set target value.

2. A control apparatus according to claim 1, wherein:
said virtual interference input calculating means calculates the virtual interference input at a predetermined period;
said virtual control input calculating means calculates the virtual control input based on a model which defines a relationship between the virtual control input and the output of the enlarged control object; and sampling periods of the virtual control input used for defining the model and the output of the enlarged control object are set to values different from the predetermined period.

3. A control apparatus according to any of claim 1, further comprising a changing speed calculating means for calculating a changing speed of a deviation of the output of the control object from the predetermined value, wherein said virtual interference input calculating means calculates the virtual interference input in accordance with the calculated changing speed.

4. A control apparatus according to claim 1, further comprising:

a changing rate calculating means for calculating a changing rate of the virtual interference input; and changing rate restricting means responsive to the calculated changing rate of the virtual interference input being higher than a predetermined changing rate for restricting the changing rate of the virtual interference input to different restricted values when the virtual interference input is increasing and when the virtual interference input is decreasing.

5. A control apparatus according to claim 1, wherein:

said control object includes a variable cam phase mechanism for changing a cam phase of at least one of an intake cam shaft and an exhaust cam shaft of an internal combustion engine with respect to a crank shaft, said output of the control object is the cam phase, said virtual interference input is applied to said variable cam phase mechanism, and said enlarged control object includes said variable cam phase mechanism applied with the virtual interference input.

6. A control apparatus according to claim 1, wherein:

said control object includes an internal combustion engine, said output of the control object is a rotational speed of said internal combustion engine, said virtual interfering force is applied to said internal combustion engine, and said enlarged control object includes said internal combustion engine applied with the virtual interference input.

7. A control apparatus comprising:

output detecting means for detecting an output of a control object;

virtual interference input calculating means for calculating a virtual interference input applied to the control object in order to generate a virtual interfering force for holding the detected output of the control object at a predetermined value;

target value setting means for setting a target value which is a target for the output of the control object; and virtual control input calculating means which assumes the control object applied with the virtual interference input as an enlarged control object for calculating a virtual control input applied to the enlarged control object based on a predetermined two-degree-of-freedom control algorithm such that an output of the enlarged control object converges to the set target value.

8. A control apparatus according to claim 7, wherein:

said virtual interference input calculating means calculates the virtual interference input at a predetermined period, said virtual control input calculating means calculates the virtual control input based on a model which defines a relationship between the virtual control input and the output of the enlarged control object, and sampling periods of the virtual control input used for defining the model and the output of the enlarged control object are set to values different from the predetermined period.

9. A control apparatus according to claim 7, further comprising a changing speed calculating means for calculating a changing speed of a deviation of the output of the control object from the predetermined value, wherein said virtual interference input calculating means calculates the virtual interference input in accordance with the calculated changing speed.

10. A control apparatus according to claim 7, further comprising:

a changing rate calculating means for calculating a changing rate of the virtual interference input; and changing rate restricting means responsive to the calculated changing rate of the virtual interference input being higher than a predetermined changing rate for restricting the changing rate of the virtual interference input to different restricted values when the virtual interference input is increasing and when the virtual interference input is decreasing.

11. A control apparatus according to claim 7, wherein:

said control object includes a variable cam phase mechanism for changing a cam phase of at least one of an intake cam shaft and an exhaust cam shaft of an internal combustion engine with respect to a crank shaft, said output of the control object is the cam phase, said virtual interference input is applied to said variable cam phase mechanism, and said enlarged control object includes said variable cam phase mechanism applied with the virtual interference input.

12. A control apparatus according to claim 7, wherein:

said control object includes an internal combustion engine, said output of the control object is a rotational speed of said internal combustion engine, said virtual interfering force is applied to said internal combustion engine, and said enlarged control object includes said internal combustion engine applied with the virtual interference input.

13. A control apparatus comprising:

output detecting means for detecting an output of a control object;

virtual interference input calculating means for calculating a virtual interference input applied to the control object in order to generate a virtual interfering force for holding the detected output of the control object at a predetermined value;

disturbance estimate calculating means which assumes the control object applied with the virtual interference input as an enlarged control object for compensating for disturbance received by the enlarged control object; and virtual control input calculating means for calculating a virtual control input applied to the enlarged control object for controlling an output of the enlarge control object in accordance with the calculated disturbance estimate through a predetermined control algorithm.

14. A control apparatus according to claim 13, wherein:
said virtual interference input calculating means calculates the virtual interference input at a predetermined period,
said virtual control input calculating means calculates the virtual control input based on a model which defines a relationship between the virtual control input and the output of the enlarged control object, and
sampling periods of the virtual control input used for defining the model and the output of the enlarged control object are set to values different from the predetermined period.

15. A control apparatus according to claim 13, further comprising a changing speed calculating means for calculating a changing speed of a deviation of the output of the control object from the predetermined value,
wherein said virtual interference input calculating means calculates the virtual interference input in accordance with the calculated changing speed.

16. A control apparatus according to claim 13, further comprising:
a changing rate calculating means for calculating a changing rate of the virtual interference input; and
changing rate restricting means responsive to the calculated changing rate of the virtual interference input being higher than a predetermined changing rate for restricting the changing rate of the virtual interference input to different restricted values when the virtual interference input is increasing and when the virtual interference input is decreasing.

17. A control apparatus according to claim 13, wherein:
said control object includes a variable cam phase mechanism for changing a cam phase of at least one of an intake cam shaft and an exhaust cam shaft of an internal combustion engine with respect to a crank shaft,
said output of the control object is the cam phase,
said virtual interference input is applied to said variable cam phase mechanism, and
said enlarged control object includes said variable cam phase mechanism applied with the virtual interference input.

18. A control apparatus according to claim 13, wherein:
said control object includes an internal combustion engine,
said output of the control object is a rotational speed of said internal combustion engine,
said virtual interfering force is applied to said internal combustion engine, and
said enlarged control object includes said internal combustion engine applied with the virtual interference input.

* * * * *